United States Patent
Loushine

(10) Patent No.: US 8,099,104 B2
(45) Date of Patent: Jan. 17, 2012

(54) LOCATION BASED SERVICES FOR INTEGRATED CELLULAR AND LAN NETWORKS

(75) Inventor: Michael J. Loushine, Loch Arbour, NJ (US)

(73) Assignee: Telcordia Licensing Company LLC, Piscataway, NJ (US)

( * ) Notice: Subject to any disclaimer, the term of this patent is extended or adjusted under 35 U.S.C. 154(b) by 1051 days.

(21) Appl. No.: 11/067,984

(22) Filed: Feb. 28, 2005

(65) Prior Publication Data
US 2005/0232189 A1     Oct. 20, 2005

Related U.S. Application Data

(60) Provisional application No. 60/547,856, filed on Feb. 26, 2004.

(51) Int. Cl.
H04W 4/00 (2009.01)

(52) U.S. Cl. ............... 455/456.1; 455/456.2; 455/456.5; 370/331; 370/338

(58) Field of Classification Search .................. 370/338, 370/339; 455/456.1, 404.1, 427, 12.1, 456.2, 455/456.5, 414.2, 41.2
See application file for complete search history.

(56) References Cited

U.S. PATENT DOCUMENTS

| | | | |
|---|---|---|---|
| 2004/0102196 A1* | 5/2004 | Weckstrom et al. | 455/456.1 |
| 2004/0203732 A1* | 10/2004 | Brusilovsky et al. | 455/426.1 |
| 2004/0203869 A1* | 10/2004 | Annamalai | 455/456.1 |
| 2004/0203914 A1* | 10/2004 | Kall et al. | 455/456.1 |
| 2004/0259546 A1* | 12/2004 | Balachandran et al. | 455/435.2 |
| 2005/0070296 A1* | 3/2005 | Maanoja | 455/456.1 |
| 2006/0025156 A1* | 2/2006 | Campbell | 455/456.1 |
| 2006/0121913 A1* | 6/2006 | Lin et al. | 455/456.1 |
| 2009/0011773 A1* | 1/2009 | Balachandran et al. | 455/456.1 |
| 2009/0137244 A1* | 5/2009 | Zhou et al. | 455/426.1 |

OTHER PUBLICATIONS

3rd Generation Partnership Project. Technical Specification Group Services and System Aspects. Functional stage 2 description of location services in UMTS (Release 1999). 3GPPTS 23.171 V3.10.0 (Jun. 2003).
3rd Generation Partnership Project. Technical Specification Group Services and System Aspects. Functional stage 2 description of LCS (Release 5). 3GPPTS 23.271 V5.8.0 (Sep. 2003).

(Continued)

*Primary Examiner* — Patrick Edouard
*Assistant Examiner* — Julio Perez
(74) *Attorney, Agent, or Firm* — Fitch Even Tabin & Flannery

(57) ABSTRACT

Determining the physical location of a WLAN client includes making a request to a core network of an integrated cellular— WLAN network. Using an HLR and WLAN client identifier, the WLAN network in which the client is located is determined. A location request is then made to a MSC/SGSN servicing that WLAN network, the MSC/SGSN then forwarding the request to a gateway that interfaces the WLAN network to the core network. Alternatively, the location request is directly forwarded to the gateway. Upon receiving the request, the gateway uses a positioning procedure(s) to determine the client's physical location. This location is then returned to the core network. According to one example positioning procedure, a database containing access point physical locations is maintained. Here, a determination is made as to which access point(s) the client can communicate. The location of the access point(s), as obtained through the database, then forms a basis for the client's location.

27 Claims, 14 Drawing Sheets

OTHER PUBLICATIONS

3rd Generation Partnership Project. Technical Specification Group Radio Access Network. Stage 2 functional specification of User Equipment (UE) positioning in UTRAN (Release 5). 3GPP TS 25.305 V5.7.0 (Sep. 2003).

3rd Generation Partnership Project. Technical Specification Group Services and System Aspects; 3GPP system to Wireless Local Area Network (WLAN) interworking; System description (Release 6). 3GPP TS 23.234 V6.3.0 (Dec. 2004).

* cited by examiner

LOCATION BASED SERVICES FOR INTEGRATED CELLULAR AND LAN NETWORKS

RELATED APPLICATIONS

This application is based on and claims priority to U.S. Provisional Application No. 60/547,856, filed on Feb. 26, 2004, by Michael Loushine, entitled, "Method and System for Positioning Clients Within Wireless Local Area Networks," the contents of which are herein incorporated by reference.

GOVERNMENT LICENSE RIGHTS

This invention was made with Government support under agreement No. MDA904-01-C-0972 awarded by the Maryland Procurement Office. The Government has certain rights in this invention.

BACKGROUND OF THE INVENTION

1. Field of the Invention

The present invention relates generally to cellular and local area networks (LANs)/wireless LANs (WLANs), and more specifically, to methods and apparatus for determining the location of subscribers within integrated cellular and LAN/WLAN networks.

2. Description of Related Art

Referring to FIG. 1, there is illustrated an example functional architecture of a generic cellular network 100 of the prior art. This network comprises a core network 102 interconnected to a plurality of radio access networks (RAN) 104, which in turn interface to a plurality of mobile stations 106 (generically referred to as user equipment) through a wireless access interfaces 108. Note that the radio access networks may be GSM/GPRS/UMTS type access networks, for example. As such, cellular network 100 may be a network as defined by the 3rd Generation Partnership Project (3GPP). As is known, a given cellular service provider's network will typically comprise a plurality of networks resembling network 100, as additionally depicted by cellular network 100a. As is also known, there are multiple service providers today, each of which will have networks resembling networks 100/100a, for example. In general, each cellular network 100, both within and across service providers, is interconnected (as illustrated by lines 110) in an appropriate fashion, including signaling and bearer channels, to allow cross communication between multiple cellular networks and between cellular networks and traditional networks, such as the public switched telephone network (PSTN) 112.

As indicated, mobile stations 106 interface/access cellular network 100 through one of a plurality of radio access networks 104, each radio access network managing the wireless access interface to the mobile stations for a given cellular region. As further illustrated in FIG. 1, each core network 102 comprises a mobile switching center (MSC) 114 and a serving general packet radio system (GPRS) support node (SGSN) 116, each of which interfaces the core network to one or more radio access networks 104. Through the MSC and SGSN, a cellular network 100 provides both circuit switched services (e.g., voice calls) and packet switched services (e.g., web browsing) to mobile stations. More specifically, MSC 114 is responsible for performing switching functions related to circuit-based connections between mobile stations. MSC 114 also provides connection to external networks, such as PSTN 112, and in this way, performs switching functions related to circuit-based connections between mobile stations and end-users on the PSTN. Similarly, SGSN 116 is responsible for performing switching functions related to packet-based connections between mobile stations and other network elements. In addition, through gateway GPRS support node (GGSN) 117, SGSN 116 provides mobile stations with connections to external packet networks 118, such as private networks and/or the Internet.

As further illustrated in FIG. 1, core network 102 also comprises a home location register (HLR)/home subscriber server (HSS) 120 (hereinafter collectively referred to as the HLR) and a visitor location register (VLR) 122, which together, as is known, provide the routing and roaming capabilities within cellular networks. Specifically, each mobile station 106 is associated with or registered with a given cellular network 100, which is referred to as the mobile station's home network. A mobile station can also roam outside its home network to other cellular networks 100 both within the mobile station's service provider network and to the networks of other providers. Cellular networks beyond a mobile station's home network are referred to as visited networks. Significantly, all administrative information related to a mobile station, including the mobile station's current location (i.e., to which core access network 100 is the mobile station currently connected), are stored in the HLR of the mobile station's home network.

More specifically, when roaming to a visited network for example, a mobile station registers with the MSC 114 and/or SGSN 116 within that visited network, causing selected information related to the mobile station to be stored within VLR 122 of the visited network. More importantly, as is known in the art, as part of this registration process the HLR of the mobile station's home network is essentially updated with a location/address that can be correlated to the visited network's MSC/SGSN (i.e., the HLR is essentially updated with the address of the MSC or SGSN to which the mobile station registers). As such, the HLR maintains the current location of the mobile station, enabling the mobile station to be located.

As an example, when a call is placed to a mobile station, the mobile station's HLR is determined, using for example, the mobile station's phone number. The HLR is then queried to determine whether the mobile station is within its home network or a visited network. If within a visited network, the HLR provides routing information corresponding to the MSC/SGSN of the visited network, allowing the call to be properly routed to the MSC/SGSN of the visited network and onto the radio access network in which the mobile station is currently located (as is known, this location mechanism provided by the HLR typically occurs through interactions between the HLR and the VLR of the visited network).

Within the context of cellular networks, cellular service providers have realized that there is a need and benefit for location-based services (LBS), or in other words, for being able to determine the physical/geographic location of mobile stations (i.e., not only determining which core access network the mobile station is currently in as described above, but for determining the actual physical location of the mobile station, such as longitude and latitude coordinates). For example, when a mobile subscriber dials 911, it is necessary to determine the physical location of that subscriber/mobile station. From a commercialization standpoint, location-based services also provide additional revenue to cellular service providers. For example, through location-based services, cellular service providers can provide a service to mobile subscribers that allows subscribers to request their own locations and thereby directions to desired locations. Similarly, through location-based services, cellular service providers can provide a service to external customers, such as advertisers, that allows advertisers to request the location of mobile stations and to then send advertisements related to stores geographically near those mobile stations. One skilled in the art will readily realize that there are numerous other uses and benefits to being able to determine the physical location of mobile stations.

In response to this need for location-based services, standards bodies, such as the 3GPP, have defined standards for providing location-based services within cellular networks (see, e.g., "3GPP TS 23.171: Functional stage 2 description of location services in UMTS," and related documents). Assuming all cellular service providers implement such standards, there now exists the ability to ubiquitously determine the location of a mobile station, no matter which cellular network 100 the mobile station is located. For example, each cellular service provider can provide location-based services to an LBS client 124 (see FIG. 1). This LBS client may be internal to a cellular service provider, such as a 911 operator, or may be an external customer of the cellular service provider, such as a mobile subscriber. This LBS client can make a request to any given service provider for the location of a mobile station and through location-based services, the physical location (e.g., longitude and latitude coordinates) of that mobile station can be provided regardless of whether that mobile station is within its home network or a visited network of its own provider or another provider.

For example, according to 3GPP standards, location-based services are provided through the incorporation of a gateway mobile location center (GMLC) 126 within core network 100 and through added functionality to the MSC, SGSN, radio access networks, and possibly the mobile stations. In general, an LBS client 124 accesses a GMLC 126 of a core network and requests the location of a particular mobile station 106, specifying an identity for the mobile station (e.g., the mobile station's phone number). Based on this request, GMLC 126 accesses the indicated mobile station's HLR and determines the MSC/SGSN to which the mobile station is currently registered. This operation is similar to determining the location of a mobile station for call routing purposes. Once knowing the MCS/SGSN, the GMLC forwards the request to the determined MSC/SGSN, for example, which in turn forwards the request to the radio access network to which the mobile station is currently associated. The radio access network then proceeds to determine the physical location of the mobile station. For example, the radio access network may request that the mobile station tune to GPS satellites to obtain the mobile station's current coordinates. Once having the mobile station's location, the radio access network then returns the location to the GMLC through the MSC/SGSN. The GMLC then returns the location to LBS client 124.

In addition to cellular networks, wireless local area networks (WLANs) are also experiencing large growth. As compared to the packet services provided by cellular networks, WLAN networks typically provide higher speed data access. In addition, rather than providing the broad coverage typically found in cellular networks, WLAN networks are typically deployed, at present, in a localized fashion (i.e., hotspots), such as airports, hotels, shopping malls, coffee houses, homes, etc. Referring now to FIG. 2, there is illustrated a functional architecture of an example WLAN network 200 of the prior art. As illustrated, example WLAN network 200 is an IP-based network that comprises a plurality of network elements including an IP backbone network 202 that interconnects a plurality of access points (APs) 204, which in turn interface to a plurality of WLAN clients 206 (generically referred to as user equipment) through wireless access interfaces 208, such as Bluetooth or IEEE 802.11a/b/g. As shown, WLAN networks typically interconnect to the Internet 210.

Similar to cellular networks, location-based services also exist for WLAN networks. Such services determine and report the geographic/physical location of a WLAN client. However, existing systems that provide location-based services for WLAN networks are typically proprietary and specific to a given WLAN network, prohibiting the easy integration across WLAN networks. For example, although WLAN networks are interconnected through the Internet, for example, because of the proprietary nature of the different systems, it is not possible to access a single interface and locate a WLAN client regardless of which WLAN network the client is currently associated with.

As is also known, WLAN networks are being integrated with cellular networks. For example, the 3GPP has defined standards for the integration of GSM/GPRS/UMTS based cellular networks with WLAN networks (see, e.g., "3GPP TS 23.234: WLAN Subsystem; System Description," and related documents). Referring to FIG. 3, there is illustrated an example functional architecture of an integrated cellular and WLAN network 300 of the prior art. Again, a given service provider's network will typically comprise a plurality of networks resembling network 300. As seen, core network 302 of the cellular network continues to interconnect to a plurality of radio access networks 104/mobile stations 106 through MSC 314 and SGSN 316, as described above. However, core network 302 now also interconnects to a plurality of WLAN networks 202 and WLAN clients 306. As illustrated in this example network, the interconnection between the WLAN networks 202 and core network 302 occurs through MSC 314 and SGSN 316 of the core network and through the addition of gateway 330 to WLAN networks 202. In general, this integrated network allows WLAN clients 306 to utilize the services of the cellular network, including circuit switched services through the MSC and packet based services through the SGSN.

In this integrated network, a WLAN client 306 is administratively handled similar to a mobile station 106. Specifically, each WLAN client can roam between different networks 300, similar to mobile stations. As such, each WLAN client is assigned a home network and has an entry within its home network's HLR 320, similar to a mobile station. In addition, each WLAN client is tracked by its HLR similar to how mobile stations are tracked and as such, each HLR knows the current location of its WLAN clients (i.e., to which core access network 300 is the WLAN client currently connected). Specifically, each time a WLAN client 306 is powered on in a network 300 or moves between networks 300, WLAN client 306 will register with MSC 314 and/or SGSN 316 that is connected to the WLAN network in which the WLAN client is currently located. The result of this registration resembles that of a mobile station, causing the HLR of the WLAN client's home network to be updated with a location/address that can be correlated to the MSC or SGSN to which the WLAN client is currently registered. Again, this allows the WLAN client's HLR to be queried to determine in which WLAN network the WLAN client is currently located.

Significantly, ubiquitous location-based services do not exist in these integrated cellular and WLAN networks. In other words, an LBS client 124 requesting that GMLC 126 determine the location of a particular mobile subscriber will only be able to find the location of mobile stations 106 connected to radio access networks 104 and will not be able to determine the location of WLAN clients 306 connected to WLAN networks 202. In order to determine the physical location of a WLAN client, one of the WLAN network specific protocols must be used.

This lack of a ubiquitous location-based service presents several problems. Significantly, in this integrated architecture, WLAN clients will be able to make voice calls, for example. However, it will be difficult to determine whether these voice calls originate from the traditional cellular network or from the WLAN networks. This presents a problem when emergency calls are made from WLAN networks because 911 operators now may need to make several requests, to both the cellular network and to the individual WLAN networks, to find a caller. In addition, it is also difficult for a service provider of such an integrated network to provide commercial-based services because there is no one single procedure that can be used to locate a subscriber.

SUMMARY OF THE INVENTION

Accordingly, it would be desirable to have an industry-wide architecture and procedure for determining the physical location of wireless subscribers, whether the subscribers are mobile stations within a cellular network or WLAN clients within a WLAN network, thereby overcoming the above and other disadvantages of the prior art. According to the present invention, ubiquitous location based services are provided within an integrated cellular and WLAN network (e.g., a 3GPP based network), allowing a wireless subscriber, whether a mobile station interfaced to a radio access network or WLAN client interfaced to a WLAN network, to be physically located through a single request to an industry wide interface. Specifically, according to an example functional architecture of the present invention, the core network of the integrated network comprises a GMLC and a system control module within each of the MSC and SGSN of the core network. In addition, each WLAN network of the integrated network includes an associated "gateway location services module" that is preferably situated within a gateway that interfaces the core network and the WLAN network. This gateway location services module interfaces to the GMLC either directly, or through the system control module of the MSC and/or SGSN. The functional architecture also optionally comprises a "WLAN client services module" within each WLAN client.

In accordance with an embodiment of the present invention, an LBS client accesses an industry wide interface provided by the GMLC and requests the physical location of a mobile station or a WLAN client, providing the GMLC with a unique identifier (e.g., a phone number, IP address, etc.) of the mobile station or the WLAN client. The LBS client may be, for example, an internal system of the cellular provider, a wireless subscriber itself, or an external customer of the service provider.

Once having a unique identifier for the requested mobile station or WLAN client, the GMLC correlates the identifier to a corresponding HLR and requests from the HLR routing information to the MSC or SGSN associated with the radio access network or WLAN network in which the mobile station or WLAN client is located. Notably, the GMLC of the present invention does not make a determination as to whether the location request it receives from the LBS client is for a mobile station or WLAN client, thereby handling each request in a different fashion. Rather, the GMLC proceeds in the same fashion regardless of the subscriber type. In this way, the present invention provides a ubiquitous and integrated procedure for locating wireless subscribers.

Once having the location of an MSC or SGSN, the GMLC makes a location-based services request to the "system control module" of the MSC or SGSN requesting the location of the specified mobile station or WLAN client. Assuming the location-based services request is for a mobile station, the process of how the system control module handles the request and how the radio access network subsequently locates the mobile station is as previously defined by the 3GPP, for example. As such, assuming the location-based services request is for a WLAN client, the system control module first determines which WLAN network the specified WLAN client is on (using known methods) and then, optionally, pages that client to verify the client is active and on the determined WLAN network. The system control module may also authenticate the WLAN client at this time.

Assuming the system control module verifies the presence and authenticity of the WLAN client, the module next forwards and location request to the gateway of the WLAN client's network and in particular, to the "gateway location services module." Specifically, each WLAN network has an associated gateway location services module that is responsible for overseeing the determination of the physical location of WLAN clients that are currently interfaced to that WLAN network. The gateway location services module determines physical locations by executing one of, or a combination of, several different positioning procedures. Notably, several procedures require the assistance of the WLAN client whose location is being requested. The WLAN client provides this assistance through the "WLAN client services module." In general, a given gateway location services module within a given WLAN network need not support all positioning procedures and a given WLAN client need not support the same procedures as a given gateway location services module, if any at all.

As such, once the gateway location services module receives a location-based services request from the system control module of an MSC/SGSN, it selects an appropriate positioning procedure and then uses this procedure, possibly with the assistance of a WLAN client services module, to determine the physical location of the requested WLAN client. The gateway location services module then returns the determined location back to the LBS client through the MSC/SGSN and GMLC.

According to another embodiment of the present invention, rather than the GMLC conveying a location-based services request through a MSC/SGSN to a gateway/"gateway location services module" as described above, the GMLC communicates directly with the gateway. Here, the HLR corresponding to the requested WLAN client maintains an address for the gateway associated with the WLAN network in which the WLAN client is currently located. As such, when the GMLC accesses the HLR as described above, it obtains an address of the gateway, rather than an address of an MSC/SGSN. Accordingly, the GMLC then forwards the location-based services request directly to the gateway, bypassing the MSC/SGSN.

According to this embodiment of the invention, the gateway now also includes a "GMLC interface module," which resembles the MSC/SGSN system control module. As such, the GMLC interface module receives the location-based services request from the GMLC and then pages/authenticates the requested WLAN client. Assuming the GMLC interface module verifies the presence and authenticity of the WLAN client, it then passes the location request to the gateway location services module, which then proceeds as described above. Once determining the physical location of the requested WLAN client, the gateway location services module then returns the location to the GMLC interface module, which then forwards the determined location back to the GMLC.

As indicated, according to the present invention, the gateway location services module and WLAN client services module can use several different positioning procedures to determine the physical location of a WLAN client within a WLAN network. In one example positioning procedure, each access point within a WLAN network maintains a notion of its own physical location (e.g., its longitude and latitude coordinates) and service area. Here, the gateway location services module requests that the WLAN client services module determines an access point in close proximity to the WLAN client. The determined access point may be, for example, the access point that the WLAN client is currently associated with or an access point providing strong signals to the WLAN client. The gateway location services module then queries the determined access point for its physical location, this location then becoming an approximate location for the WLAN client. According to another example positioning procedure, rather than the gateway location services module requesting that the WLAN client services module determines an access point, the gateway location services module queries each access point in the WLAN network to determine which access point is currently servicing the WLAN client. This access point's location is then used as the WLAN client's approximate location.

According to another aspect of the present invention, rather than have each access point maintain its physical location and service area as described above, this information is maintained in a database. Each WLAN network can maintain its own local database, with each local database maintaining access point information for the access points within its corresponding WLAN network. Alternatively, the local databases can be consolidated into a regional database(s) such that the regional database maintains access point information for access points across a plurality of WLAN networks. In this second case, a regional server, such as a serving mobile location center (SMLC), can maintain the regional database.

According to example positioning procedures that utilize the access point databases, the gateway location services module operates as above to determine an access point in close proximity to the requested WLAN client. However, rather than subsequently querying an access point for its location, the gateway location services module accesses a local or regional database.

According to another example positioning procedure, the gateway location services module requests that the WLAN client services module determines one or more access points in close proximity to the WLAN client and that the module also determines the signal strength of the signals each of these access points is providing to the WLAN client. Here, the gateway location services module then determines the physical location of each access point, by querying the local/regional database, for example, or by querying the individual access points. The gateway location services module then uses a combination of the physical locations and signal strength measurements of each access point to obtain a location for the WLAN client.

According to a further example positioning procedure, the gateway location services module asks the WLAN client services module for the physical location of the WLAN client. Here, the WLAN client services module can use a GPS receiver at the WLAN client to obtain positioning coordinates from GPS satellites, these positioning coordinates than acting as the physical location of the WLAN client. Alternatively, the WLAN client services module can ask the WLAN client user/subscriber to provide its physical location, such as in the form of a street address.

According to a further alternative positioning procedure, the gateway location services module provides the WLAN client services module with the physical location of an access point in close proximity to the WLAN client, this location acting as a general location of the WLAN client. The gateway location services module then requests that the WLAN client services module further delineates the location of the WLAN client within this general location. Here, the WLAN client services module can use the general location in combination with a GPS receiver and GPS satellites to perform assisted GPS, as is known in the art. Alternatively, the WLAN client services module can ask the WLAN client user/subscriber to further designate a location relative to the provided general location, this designated location then becoming the physical location of the WLAN client.

Overall, one skilled in the art will recognize that the present invention is not limited to the positioning procedures described above and other procedures and variations of the above procedures are possible.

According to another embodiment of the present invention, a regional server, such as an SMLC, not only provides a regional database of access point locations as described above, but also assists in determining the physical location of WLAN clients. Specifically, rather than have each gateway location services module across a plurality of WLAN networks perform the same functions, some functions are moved to a regional server. For example, as indicated, access point locations together with access point signal strength measurements can be used to obtain WLAN client locations using known calculation functions. Rather than have each gateway location services module perform such calculations, the calculations are moved to a regional server.

Advantageously, according to the present invention, a single location based services request can be made for a wireless subscriber, whether that subscriber is located in a cellular network or WLAN network. As such, the present invention provides for an industry-wide architecture for ubiquitously locating wireless subscribers. In addition, it should also be noted that the present invention is not limited to location based services for integrated cellular and WLAN networks. Specifically, LANs (e.g., Ethernet) can also be interfaced to core networks of cellular networks and through a functional architecture and positioning procedures similar to those described, the physical location of LAN clients can also be determined in a ubiquitous fashion.

Other features and advantages of the present invention will become apparent from the following description of the invention, which refers to the accompanying drawings.

DETAILED DESCRIPTION OF THE PREFERRED EMBODIMENTS

Figure 1:
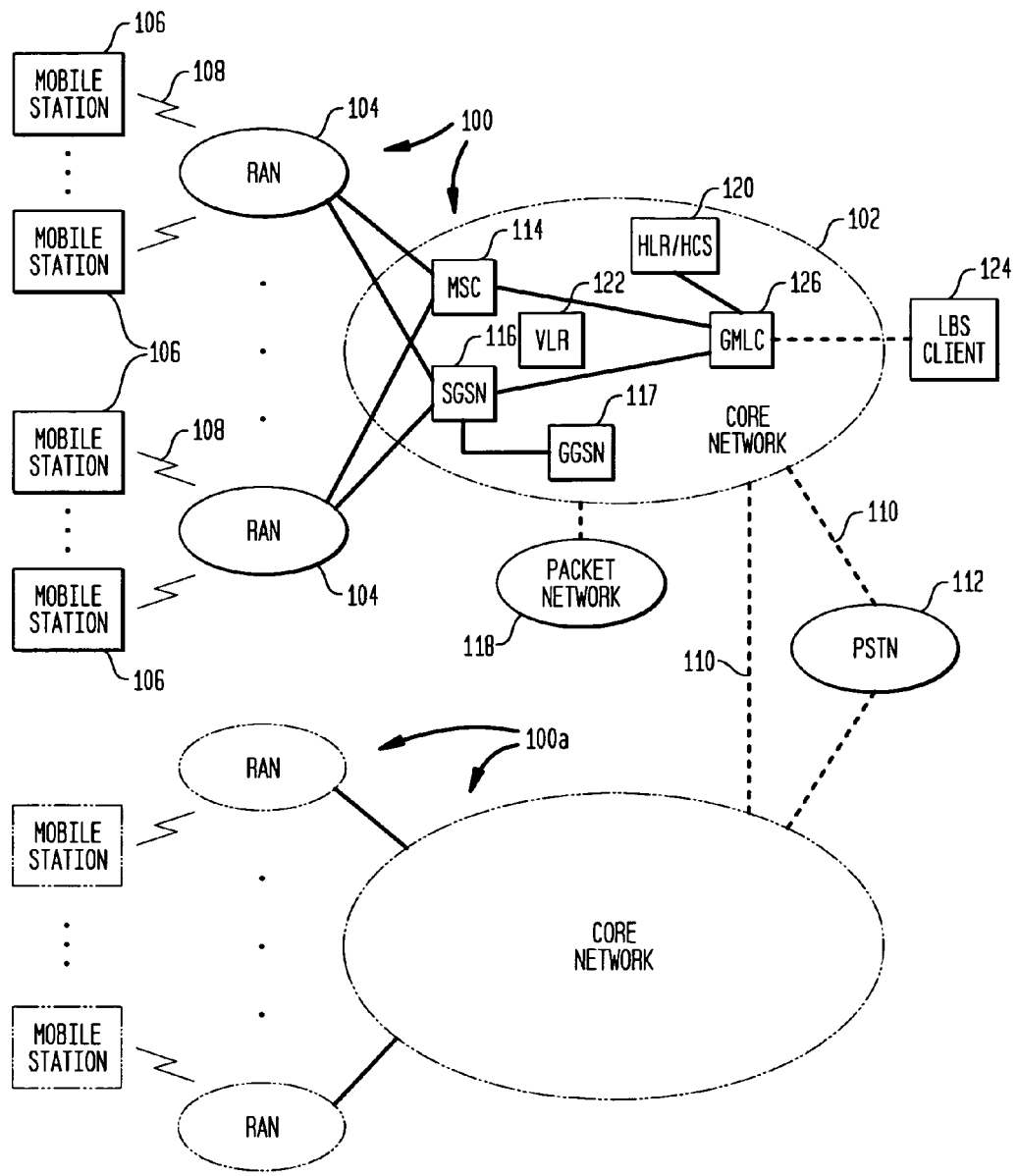
FIG. 1 illustrates an example prior art cellular network and an example prior art functional architecture that supports location-based services for mobile stations.
Figure 2:
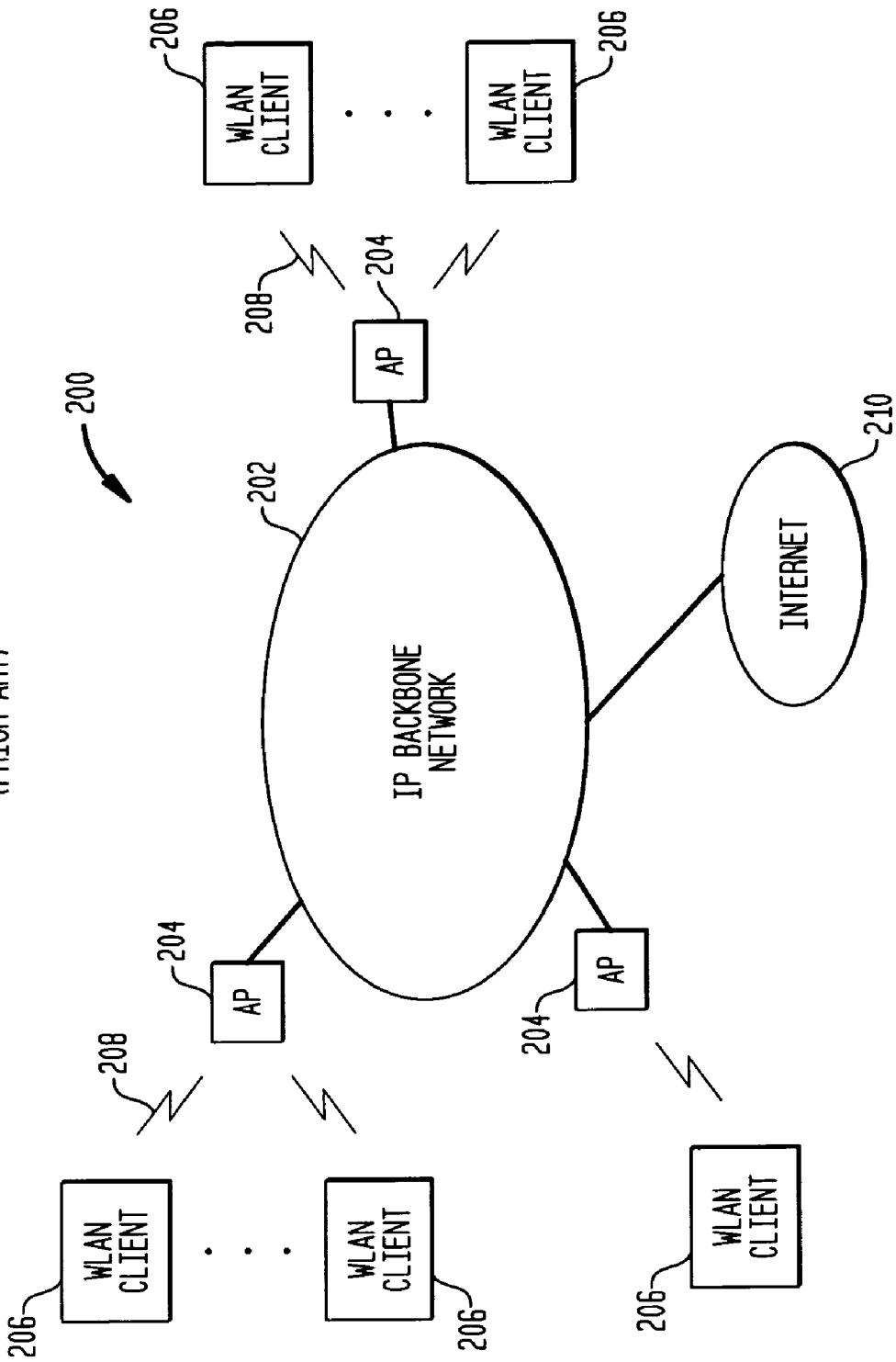
FIG. 2 illustrates an example prior art wireless local area network (WLAN network)
Figure 3:
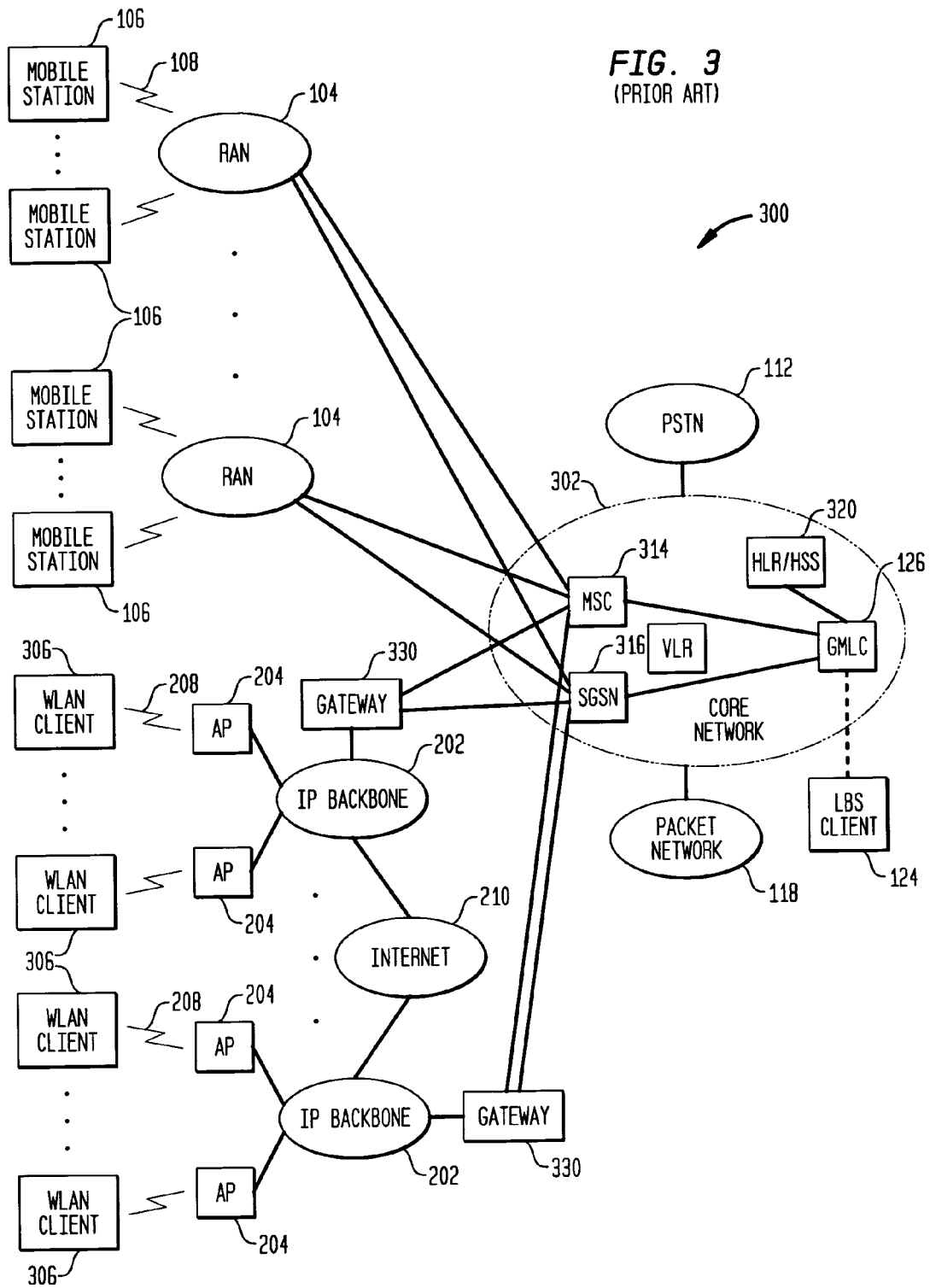
FIG. 3 illustrates an example prior art integrated cellular and WLAN network.
Figure 4:
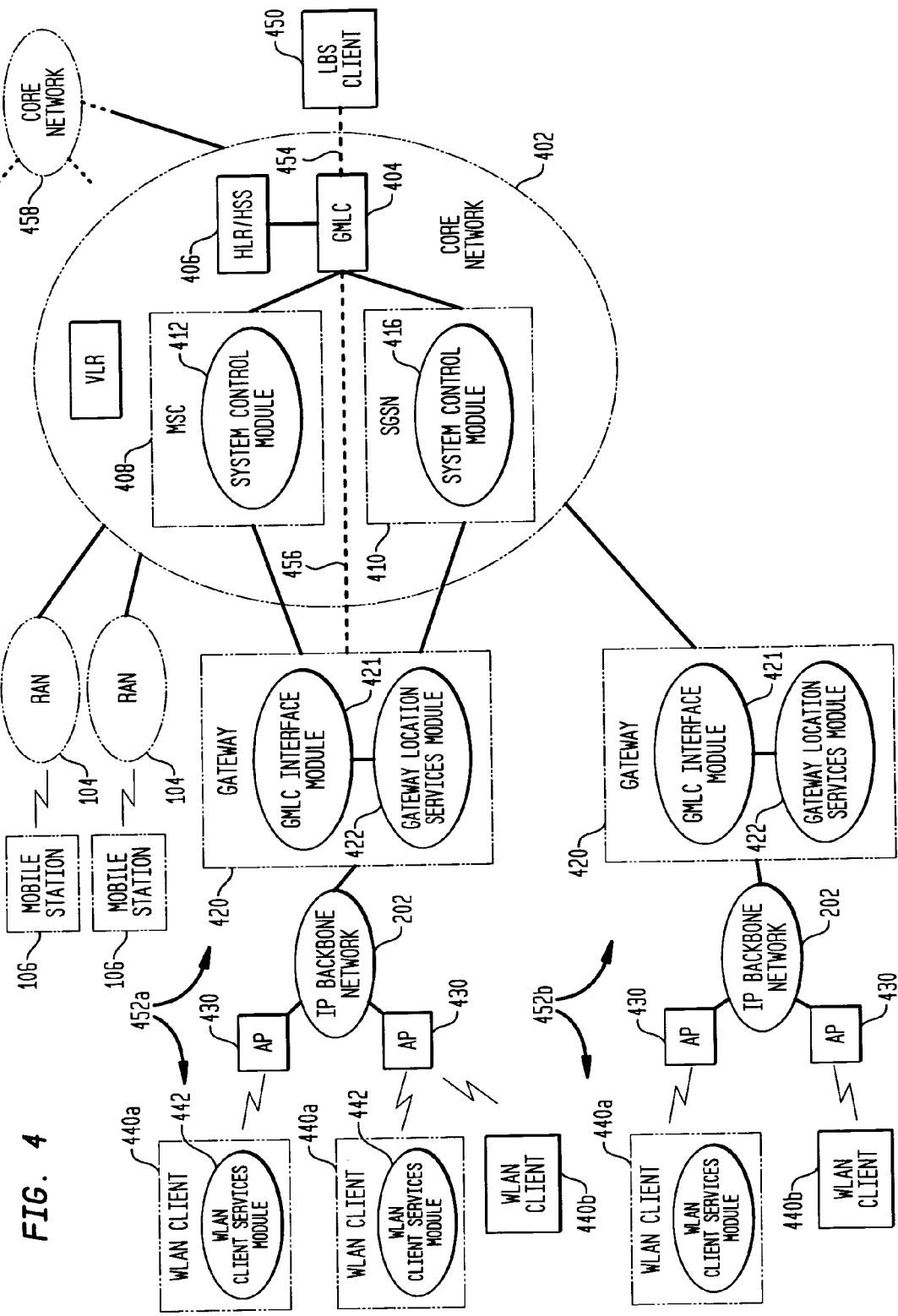
FIG. 4 illustrates an example functional architecture within an integrated cellular and WLAN network for supporting integrated location-based services for both mobile stations and WLAN clients, according to an embodiment of the present invention.

Referring to FIG. 4, there is illustrated an example functional architecture according to an embodiment of the present invention for determining the physical location (i.e., location-based services) of both mobile stations 106 and WLAN clients 440 within an integrated cellular and WLAN network. As illustrated in FIG. 4, the integrated network, comprises core network 402 interconnected to a plurality of radio access networks 104 and to a plurality of WLAN networks 452. As an example, the integrated network is a GSM/GPRS/UMTS cellular and WLAN network as defined by the 3GPP. Nonetheless, one skilled in the art will recognize that the present invention is also applicable to other cellular network architectures (e.g., IS-95 and CDMA 2000 networks) that include integrated WLAN networks. Note that the type of WLAN networks 452 of the integrated network is not specific to the present invention and can include, for example, IEEE 802.11a/b/g, Bluetooth, and ETSI BRAN Hiperlan2 type technologies. Note also that the functional architecture of the present invention is depicted as an extension of location-based services as defined by the 3GPP; however, the present invention is not specific to 3GPP based location based services.

As illustrated in FIG. 4, the functional architecture of the present invention comprises GMLC 404, system control module 412 within MSC 408, and system control module 416 within SGSN 410, each of which is within core network 402. The functional architecture further comprises a "gateway location services module" 422 within each WLAN network 452 that is connected to core network 402 and also includes "WLAN client services module" 442 within WLAN clients 440. Note that module 442 is optional and as such, any given WLAN client may or may not include this module (as illustrated by WLAN clients 440a and 440b). Note that FIG. 4 only shows detailed interconnection between core network 402 and one WLAN network, network 452a. Nonetheless, each radio access network 104 within the integrated network is connected to MSC 408 and SGSN 410. In addition, each WLAN network, such as network 452b, within the integrated network is connected to MSC 408, SGSN 410, and optionally GMLC 404, as illustrated by WLAN network 452a. Further note that any given service provider will typically include several integrated cellular/WLAN networks with each network interconnected in an appropriate fashion, as additionally depicted, for example, by network 458 in FIG. 4. Each of these integrated cellular/WLAN networks will include the functional architecture of the present invention as illustrated in FIG. 4 (however, note that it may not be necessary for each core network to include its own GMLC 404). Similarly, note that different service providers will also provide such networks as depicted in FIG. 4, the various service provider networks all being interconnected in an appropriate fashion, as is known in the art.

Figure 5:
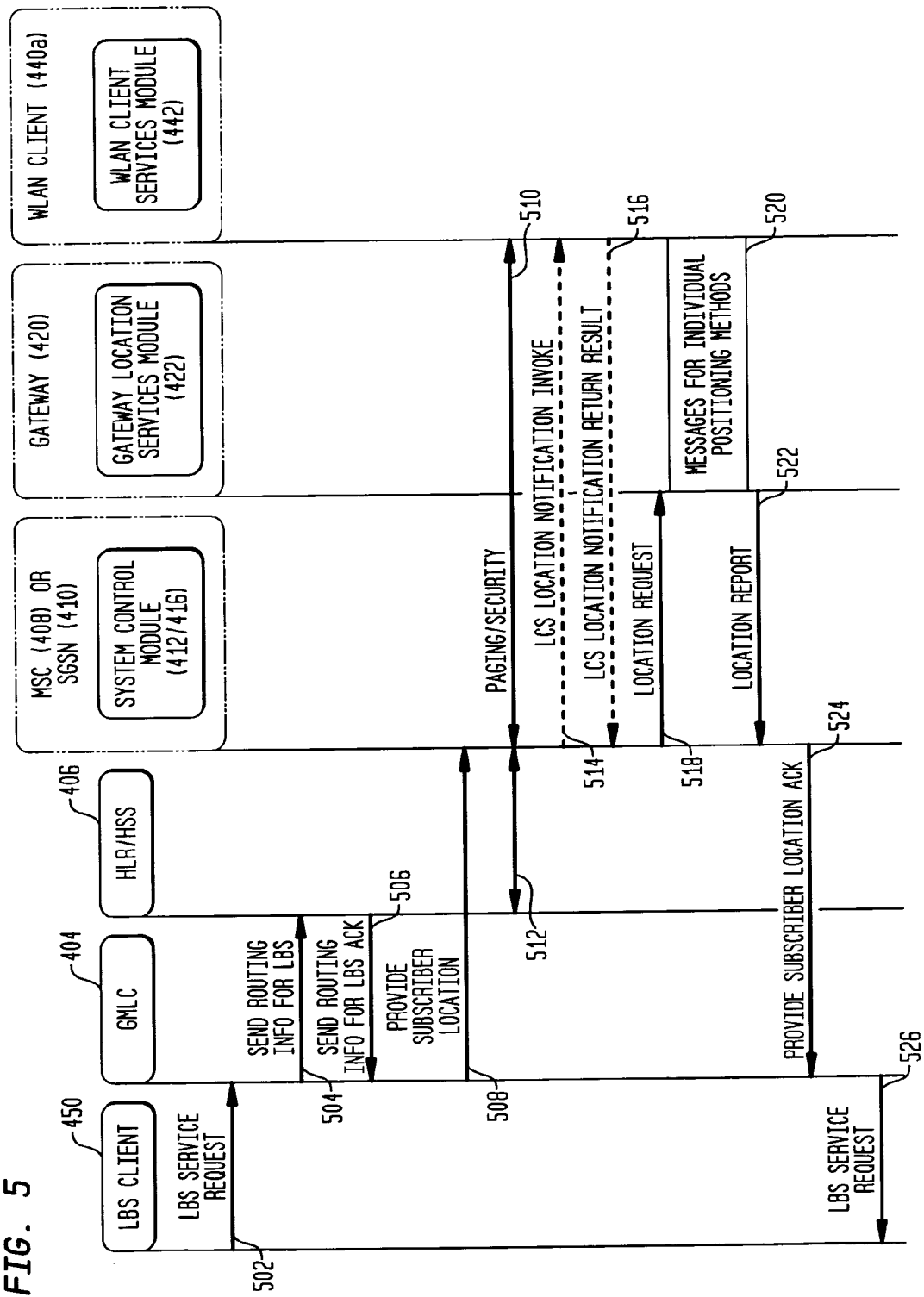
FIG. 5 illustrates an example procedural flow according to an embodiment of the present invention for determining the physical location of a WLAN client based on a location-based services request originating from a core network of a cellular network.

Referring now to FIG. 5, there is depicted an example procedural flow according to an embodiment of the present invention based on the functional architecture as shown in FIG. 4. Note that in this embodiment of the invention, GMLC 404 communicates with MSC 408/SGSN 410, which in turn communicate with each "gateway location services module" 422 of the various WLAN networks 452. However, in accordance with an alternative embodiment of the present invention as described below, the GMLC may bypass the MSC/SGSN and communicate directly with the WLAN networks, as depicted by connection 456 in FIG. 4. Note also that for the purpose of describing the present invention, reference will be made to the GMLC, MSC/SGSN, and HLR of core network 402 as shown in FIG. 4. However, again, each service provider will have a plurality of networks as depicted in FIG. 4, each of these networks being interconnected in an appropriate fashion (as represented by network 458). As such, when reference is made to GMLC 404 communicating with an HLR 406 and MSC 408/SGSN 410 below, GMLC 404 may be communicating with elements within its own core network or those of another core network.

Beginning with GMLC 404, it provides an industry-wide interface 454 to LBS clients, as represented by LBS client 450, allowing these clients to access the location-based services of the network and in particular, to request the physical location of both mobile stations 106 and WLAN clients 440. In general, LBS client 450 may be an internal system of the network service provider, may be a wireless subscriber of the service provider, or may be an external customer of the network service provider that utilizes the location-based services to provide value added services to wireless subscribers, for example. Regardless of the type of client, LBS client 450 will initially access, in step 502, GMLC 404 and make a location-based services request, providing a unique identifier for the subscriber the LBS client wants to locate. This unique identifier can be, for example, a phone number, an IMSI (International Mobile Subscriber Identity), an IP address, a Uniform Resource Identifier (URI), etc.

As indicated above, just like mobile stations, each WLAN client has a home network, such as the network depicted in FIG. 4, and a corresponding HLR 402 within the core network of that home network. In addition, like mobile stations, this HLR maintains the current location of its WLAN clients, or in other words, maintains an address of the MSC 408 and/or SGSN 410 (and possibly an address of gateway 420, as described below) corresponding to the WLAN network in which the WLAN client is currently located.

As such, once having an identifier for a given mobile station 106 or WLAN client 440, GMLC 404 correlates this identifier, as known in the art, to the HLR 406 corresponding to the identifier and makes a location-based services request (step 504) to this HLR requesting routing information (i.e., an address) to the MSC 408/SGSN 410 associated with the radio access network or WLAN network in which the mobile station or WLAN client is located (i.e., the address of the MSC or SGSN to which the WLAN client is currently registered). Note that if GMLC 404 receives repeated requests for the same mobile station or WLAN client, it may already have the routing information to the MSC/SGSN, in which case, the HLR is not queried. GMLC may also request from the HLR location-based subscription data related to the mobile station or WLAN client. In particular, this subscription data may indicate that the mobile station or WLAN client does not wish to have its location made known. In this case, LBS client 450 is notified and the process ends.

It should also be noted that GMLC 404 of the present invention does not make a determination as to whether the location request it receives from LBS client 450 is for a mobile station or WLAN client, thereby handling each request in a different fashion. Rather, the GMLC essentially proceeds in the same way regardless of the subscriber type. In this way, the present invention provides a ubiquitous and integrated procedure for locating wireless subscribers.

Continuing with FIG. 5, once receiving the location of the MSC 408/SGSN 410 from the HLR (step 506), the GMLC next sends a subscriber location request (step 508) to MSC 408/SGSN 410 as specified by the HLR, and in particular, sends the request to system control module 412/416 of the MSC/SGSN. System control module 412/416 can be implemented in firmware and/or software and executed on a computer based processor, for example, and is essentially responsible for receiving the request from the GMLC and forwarding the request to the appropriate radio access network or WLAN network, as described below. Note that assuming the location-based services request is for a mobile station, the process of how the MSC or SGSN handles this request is as previously defined by the 3GPP, for example. The location of mobile stations within the cellular network will therefore not be discussed further and the remainder of this discussion will focus on determining for physical location of WLAN clients.

As such, assuming the location-based service request is for a WLAN client, when the GMLC makes the request to system control module 412/416 of the MSC/SGSN, the GMLC will include an identifier(s) for the WLAN client, such as the WLAN client's phone number or IMSI, for example. If known, the GMLC may also provide system control module 412/416 with the IP address of the WLAN client. As an example, the WLAN client's IP address may be maintained within the HLR, placed there during a registration process. Alternatively, LBS client 450 may provide the IP address, as indicated above. Note that the GMLC may also provide system control module 412/416 with the identity of LBS client 450.

As is known, each MSC 408/SGSN 410 knows which WLAN network a specified WLAN client is currently on. Nonetheless, it is possible that the MSC/SGSN has not had communications with the WLAN client for a prolonged period of time. In this case, system control module 412/416 will next proceed by ensuring the specified WLAN client is still active. To make this determination, the system control module will page the WLAN client (step 510) on the WLAN client's network. Depending on the type of interface between the MSC/SGSN and the WLAN network, the system control module may perform this paging directly or alternatively, indirectly through gateway 420. Assuming the system control module directly pages the WLAN client, the module can attempt to contact the WLAN client using the WLAN client's IP address. Again, this address may be provided by GMLC 404. Alternatively, using the identifier provided by the GMLC, the system control module could perform a DNS lookup using a DNS server within the WLAN network, for example, to obtain the IP address. As a further alternative, the system control module may multicast the page on the WLAN network.

Assuming the WLAN client is active, system control module 412/416 will next authenticate the WLAN client using known methods. Note that this authentication may require the system control module to communicate with the WLAN client's HLR 406 (step 512) to obtain authentication parameters. If either the paging or authentication fails, the system control module will abort the location request and notify the GMLC. Note also that if the MSC/SGSN has an active session with the WLAN client, steps 510 and 512 may be skipped.

Assuming the system control module 412/416 of the MSC/SGSN verifies the presence and authenticity of the WLAN client, the control module may optionally next query the WLAN client (step 514) to determine whether the WLAN client wishes to have its location made known at this time. The system control module can make this determination as to whether the query should be made based on, for example, subscription parameters maintained for the WLAN client within the HLR. In this query to the WLAN client, the identity of the requesting LBS client 450 may also be provided. Assuming the WLAN client will have its location made known (step 516), the system control module 412/416 next forwards a location request (step 518) to the "gateway location services module" 422 of the WLAN client's network.

In particular, within each WLAN network is a gateway location services module 422 that is responsible for determining the physical location of WLAN clients within that WLAN network. This module receives the location request 518 from system control module 412/416 and then uses one of, or a combination of, several different positioning procedures to determine the physical location of the requested WLAN client. While gateway location services module 422 can be located at any computer-based server within the WLAN network, it is preferably located at gateway 420 that bridges the WLAN network to core network 402, as illustrated in FIG. 4.

As indicated above, each WLAN client 440 may include "WLAN client services module" 442. This module is responsible for working with gateway location services module 422 to determine the physical location of the corresponding WLAN client. As noted, however, WLAN client services module 442 is optional. In particular, according to the present invention, the different positioning procedures that gateway location services module 422 may use to determine the physical location of a WLAN client may or may not require the assistance of the WLAN client. As such, gateway location services module 422 can locate a given WLAN client whether that client does or does not include WLAN client services module 442. As described below, gateway location services module 422 will determine the capabilities of a given WLAN client prior to using a given positioning procedure.

As such, the system control module 412/416 will forward a location request (step 518) to gateway 420, which request will get forwarded to the "gateway location services module" 422. Upon receiving this location-based services request, gateway location services module 422 will select an appropriate provisioning procedure and then use this procedure, possibly with or without the WLAN client's assistance, to determine the WLAN client's physical location (as represented by step 520). Note that the process of selecting an appropriate provisioning procedure and then performing that procedure are more fully described below. Once the gateway location services module 422 determines the physical location the requested WLAN client, it returns a location report back to system control module 412/416 (step 522). System control module 412/416 may then provide appropriate charging and billing for the provided service (to an LBS client account, for example) and then return this location report to requesting GMLC 404 (step 524), which in turn provides the location to LBS client 450 (step 526).

Referring now to an alternative embodiment of the present invention, rather than GMLC 404 conveying a location-based services request to a WLAN network through system control module 412/416 of the MSC 408/SGSN 410, GMLC 404 now communicates directly with the network, as illustrated by interface 456 in FIG. 4. More specifically, assuming gateway 420 executes gateway location services module 422 as described above, rather than have the GMLC make a location-based services request to gateway 420 and module 422 through system control module 412/416, according to this embodiment of the present invention the GMLC communicates directly with gateway 420. In this case, gateway 420 now also includes "GMLC interface module" 421, as shown in FIG. 4. GMLC interface module 421 can be implemented in firmware and/or software and executed on a computer based processor, for example. Module 421 resembles system control module 412/416 and provides the interface to the GMLC and conveys the location requests from the GMLC to gateway location services module 422.

As indicated above, an MSC/SGSN knows the WLAN network and thereby the gateway 420 to which a WLAN client is attached. As such, according to this embodiment of the invention, when a WLAN client first registers with an MSC and/or SGSN, the address (e.g., an IP address or SS7 based address, depending on the type of interface between the core network and gateway) of gateway 420 is updated within the WLAN client's HLR. Accordingly, when the GMLC makes a location request to a WLAN client's HLR (step 504 in FIG. 5), if the HLR knows gateway 420's address, this address can be returned to the GMLC rather than the address of the MSC/SGSN. In this case, the GMLC interfaces directly with gateway 420 and in particular, with GMLC interface module 421, when making location request 508. Because GMLC interface module 421 resembles system control module 412/416 of the MSC/SGSN, the interface of the GMLC is the same regardless of whether the GMLC is interfacing with the MSC/SGSN or gateway 420.

Figure 6:
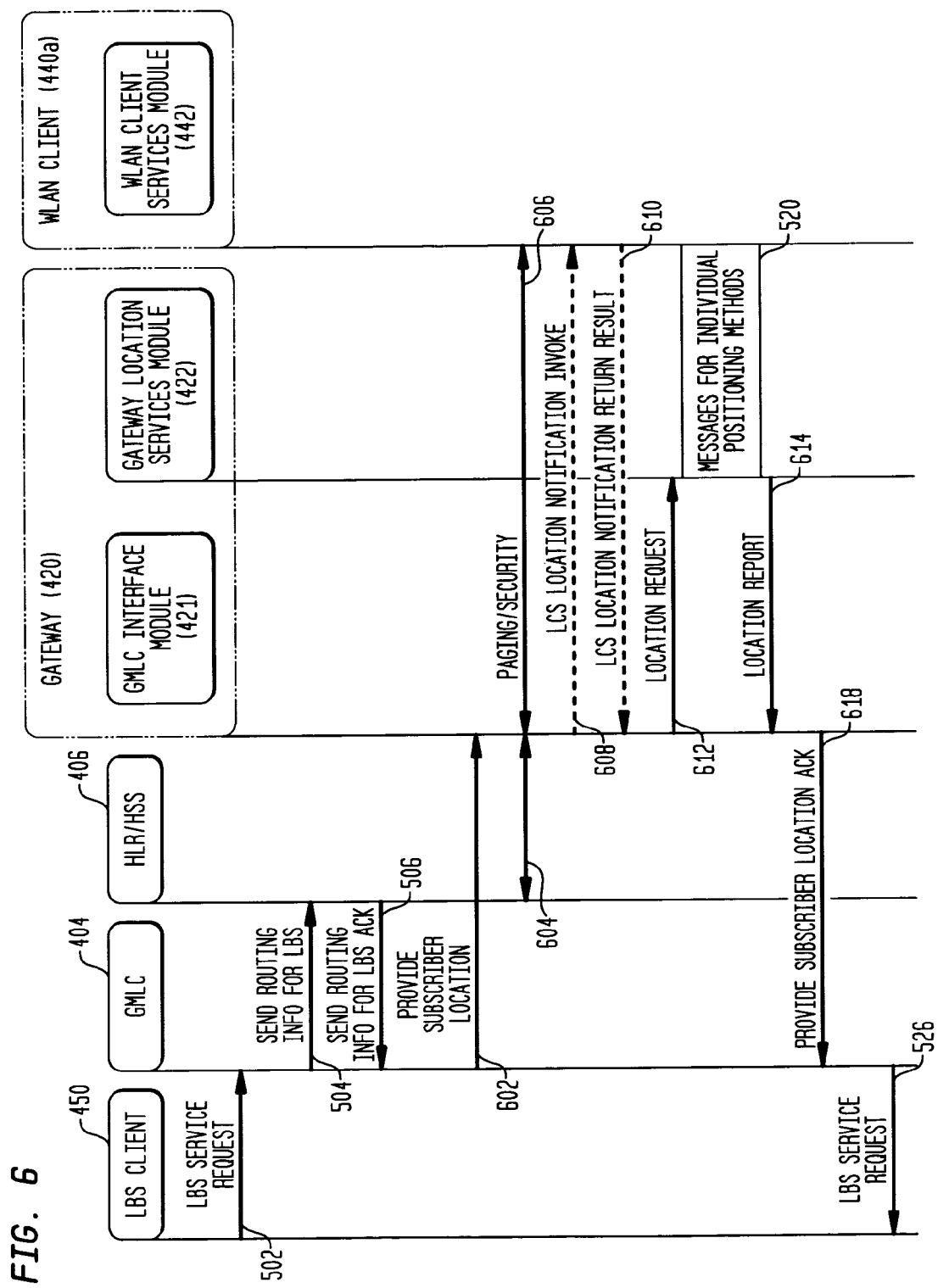
FIG. 6 illustrates an example procedural flow according to another embodiment of the present invention for determining the physical location of a WLAN client based on a location-based services request originating from a core network of a cellular network.

FIG. 6 shows a modified procedural flow according to this alternative embodiment of the invention. The procedural flow resembles that of FIG. 5. However, here, rather than convey a location request through system control module 412/416 of the MSC/SGSN, GMLC 404 now conveys, in step 602, the location request directly to gateway 420, an in particular, to GMLC interface module 421. Note that GMLC interface module 421 now performs the paging, authentication, and location notification steps (steps 604, 606, 608, and 610) rather than system control module 412/416 of the MSC/SGSN. GMLC interface module 421 will perform these steps similar to system control module 412/416, including interfacing with HLR 406. Assuming the WLAN client is found (step 606), authenticated (steps 604 and 606), and wishes to have its location made known (steps 608 and 610), GMLC interface module 421 forwards a location request to gateway location services module 422 (step 612), with module 422 then proceeding as described above. Once determining the physical location of the requested WLAN client, gateway location services module 422 then returns the location to GMLC interface module 421 (step 614), which performs appropriate charging and billing for the location service and then forwards the determined location back to the GMLC (step 618).

Figure 7:
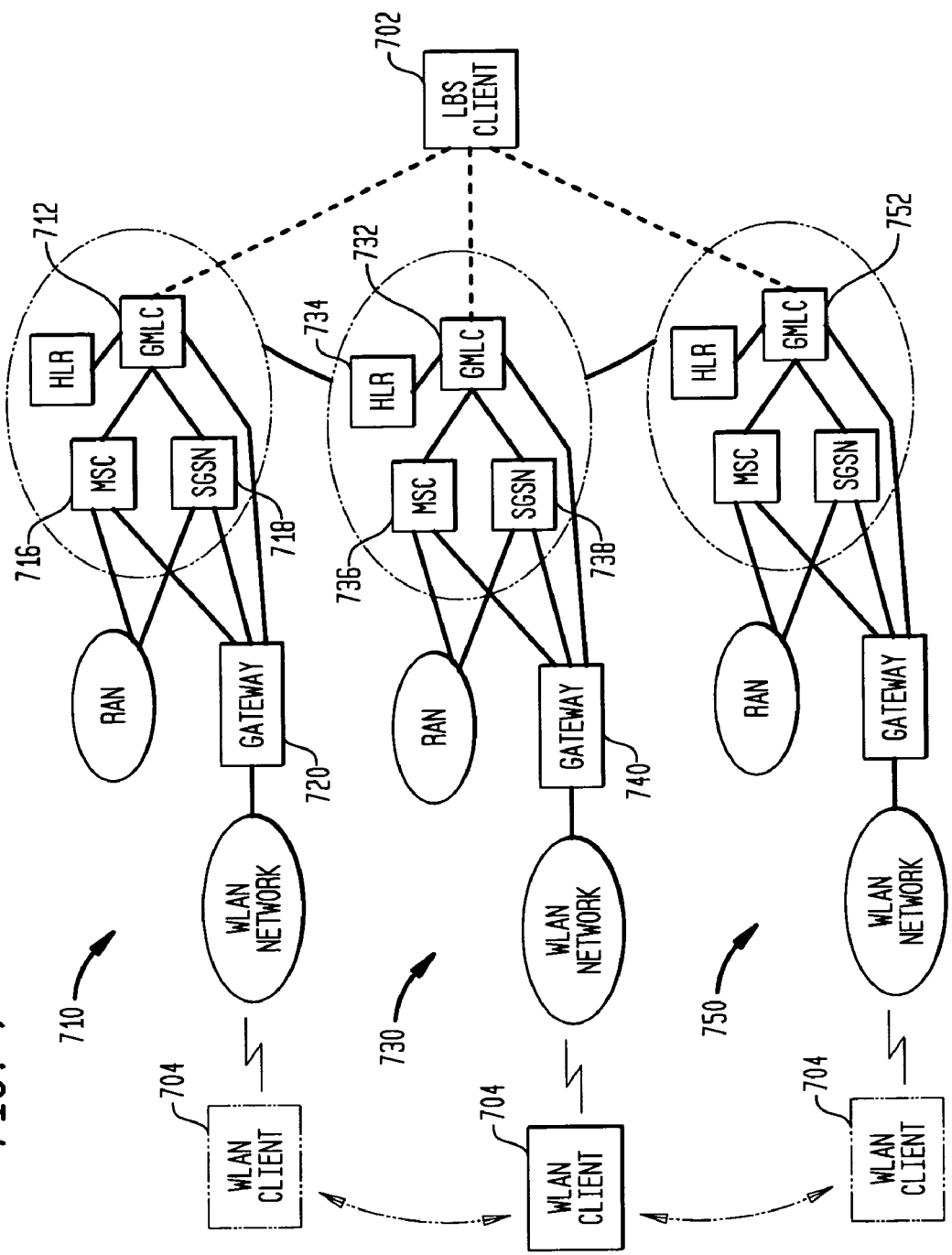
FIG. 7 illustrates an example functional architecture within an integrated cellular and WLAN network for supporting integrated location-based services for both mobile stations and WLAN clients, according to an embodiment of the present invention.

Reference will now be made in greater detail to the operation of the GMLC and in particular, which GMLC handles a given location-based services request from an LBS client. Referring to FIG. 7, there is shown an example network comprising three interconnected cellular/WLAN networks, 710, 730, and 750. Each network 710, 730, and 750 has the functional architecture of FIG. 4 and belongs to either the same service provider or to different service providers. Note that in the example network of FIG. 7, each network comprises a GMLC 712, 732, or 752. However, again, each network need not include a GMLC. For description purposes, assume that LBS client 702 wishes to find the physical location of WLAN client 704. Further assume that network 730 is WLAN client 704's home network and that WLAN client 704 can roam between networks 710, 730, and 750. According to the present invention, which of the three GMLCs that handles LBS client 702's request can vary.

Specifically, when LBS client 702 makes a LBS service request, the service provider receiving the request will determine which GMLC should handle the request. In particular, the service provider can either forward the request to the GMLC of the WLAN client's home network (in this example, GMLC 732) or to the GMLC of a visited network in which the WLAN client is currently roaming. In general, the service provider can use the WLAN client identifier provided by the LBS client to query the WLAN client's HLR (here, HLR 734) to determine whether the WLAN client is within its home network or a visited network, and thereby route the LBS service request accordingly.

Hence, as one option, the service provider can always direct the LBS service request from LBS client 702 to the GMLC of the home network, in other words, GMLC 732 in this example. In this case, GMLC 732 will proceed to query HLR 734 to determine in which network WLAN client 704 is currently located. Assuming WLAN client 704 is within its home network 730, GMLC 732 will directly oversee the LBS service request and will directly communicate with MSC 736, SGSN 738, or gateway 740 to obtain the physical location of WLAN client 704, as described above.

Assuming, however, that WLAN client 704 is roaming within another network, such as network 710, GMLC 732 can proceed in one of two ways. As one option, upon querying HLR 734 and determining WLAN client 704 is in network 710, GMLC 732 can again directly oversee the LBS service request and directly communicate with MSC 716, SGSN 718, or gateway 720 to obtain the physical location of WLAN client 704, the MSC/SGSN/gateway then preceding as described above. As a second option, GMLC 732 can forward the request to GMLC 712 of the visited network 710. Specifically, upon determining WLAN client 704 is in network 710, GMLC 732 will forward the LBS service request to GMLC 712, which will then directly communicate with MSC 716, SGSN 718, or gateway 720 to obtain the physical location of WLAN client 704. Upon obtaining the physical location of the WLAN client, GMLC 712 will forward the location back to GMLC 732, which in turn will forward the location to LBS client 702.

As another alternative, rather than the service provider always directing the LBS service request from LBS client 702 to the GMLC of the home network, the service provider can direct the request to the GMLC of the network in which the WLAN client is currently located. Hence, if WLAN client 704 is within its home network, GMLC 732 will receive the request and directly communicate with MSC 736, SGSN 738, or gateway 740 to obtain the physical location. Alternatively, if WLAN client 704 is within a visited network, such as network 710, GMLC 712 will receive the request and will directly communicate with MSC 716, SGSN 718, or gateway 720 to obtain the physical location.

Figure 8:
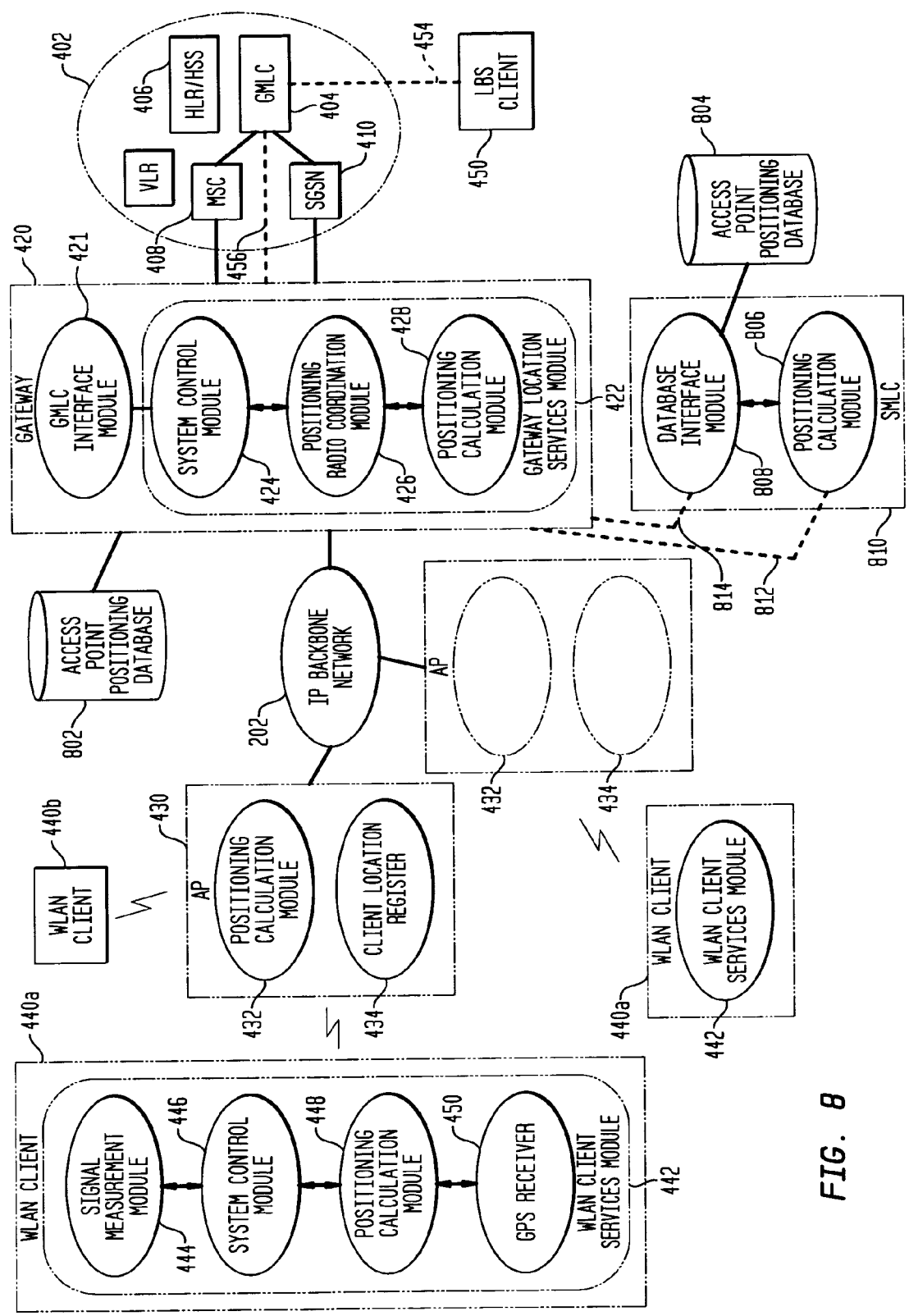
FIG. 8 illustrates an example functional architecture within a WLAN network for determining the physical locations of WLAN clients based on location-based services requests from a core network of a cellular network, according to an embodiment of the present invention.

Referring now to FIG. 8, there is illustrated a more detailed example functional architecture within the WLAN network for determining the physical location of a WLAN client within that WLAN network, according to an embodiment of the present invention. As discussed above and as illustrated in FIG. 4, the functional architecture within the WLAN network comprises gateway location services module 422 within gateway 420 and optionally, WLAN client services module 442 within the WLAN client 440a. As illustrated in FIG. 8, the gateway location services module 422 comprises three functional modules: a "system control module" 424, a "positioning radio coordination module" 426, and a "positioning calculation module" 428. Through these functional modules, the gateway location services module 422 oversees/controls the positioning process for the given WLAN network. As also illustrated in FIG. 8, the WLAN client services module 442 comprises a "system control module" 446, a "signal measurement module" 444, a "positioning calculation module" 448, and optionally, a GPS receiver 450. As discussed below, several different example positioning procedures can be executed within this example architecture for determining the physical location of a WLAN client. In general, some of these procedures require the assistance of the WLAN client and in particular, the WLAN client services module 442. However, other procedures do not require the assistance of the WLAN client. As such, it is possible to determine the location of WLAN client even if the WLAN client does not include WLAN client services module 442 (as illustrated by WLAN client 440b), thereby making module 442 optional, as indicated.

With the exception of GPS receiver 450, which requires additional hardware components be added to the WLAN client, each of the functional modules comprising the gateway location services module 422 and the WLAN client services module 442 can be implemented in software and/or firmware and executed on one or more computer-based processors, for example.

Returning to FIG. 8, the example functional architecture of the present invention may also optionally comprise at each access point 430 a "positioning calculation module" 432 and a "client location register" 434. In addition, the architecture may optionally include "access point positioning database" 802 and/or 804. Again, several different example positioning procedures can be executed within the example functional architecture of FIG. 8 for determining the physical location of a WLAN client. Several of these procedures do not require positioning calculation module 432, client location register 434, and access point positioning database 802/804. As such, as indicated, these modules are optional.

Beginning with system control module 424 of the gateway location services module 422, this module initially receives location request 518 from system control module 412/416 of the MSC/SGSN or location request 612 from GMLC interface module 421 of the gateway, as described above. Once receiving this request, system control module 424 then oversees the process of determining the location for the specified WLAN client. In particular, this may include the system control module determining the IP address of the specified WLAN client on the WLAN network. As indicated above, this address may be provided by the GMLC (as obtained from the HLR or the LBS client, for example) as part of the location request. Alternatively, system control module 424 will use the unique identifier for the WLAN client as provided by the GMLC to obtain an IP address using, for example, a DNS look-up.

System control module 424 will also determine the positioning procedure that should be used to determine the physical location of the requested WLAN client. Again, a WLAN network can simultaneously support several different positioning procedures. This determination by system control module 424 as to which procedure to use can be based on several factors including which procedures are supported by the WLAN network/gateway location services module 422 and which procedures are supported by the particular WLAN client. Note that which procedures a given WLAN client supports can be maintained as provisioning parameters within the WLAN client's HLR and provided to system control module 424 by the GMLC in the location request, for example. Another factor in determining a positioning procedure is the desired accuracy and precision in the resulting location, given that different positioning procedures provide different results. Here, the GMLC may obtain the desired accuracy/precision from the LBS client 450, for example, and include this information in the location request to system control module 424. As a further alternative to system control module 424 determining a procedure, the GMLC may specify the positioning procedure that should be used. Nonetheless, based on the available information, system control module 424 will select an appropriate procedure. Once having done so, system control module 424 then invokes positioning radio coordination module 426, specifying the IP address of the WLAN client and the selected positioning procedure. Positioning radio coordination module 426 then proceeds as described below to determine the WLAN client's physical location.

It should be noted that system control module 424 may receive multiple overlapping location requests for different WLAN clients. Accordingly, system control module 424 will also coordinate these various requests within the WLAN network.

Reference will now be made to several example procedures that can be executed by the functional architecture of FIG. 8 for determining the physical location of a WLAN client. In general, it should be noted that while each procedure is discussed separately, gateway location services module 422 may use several procedures together for a given WLAN client in order to obtain a more accurate location. It should also be noted that gateway location services module 422 for a given WLAN network need not support each of the described positioning procedures. Similarly, WLAN client services module 442, when present in a given WLAN client, does not need to support each of the described procedures. In addition, a given WLAN client services module 442 for a given WLAN client need not support each of the procedures supported by a given gateway location services module 422 within a given WLAN network. Similarly, each of the access points 430 within a given WLAN network does not need to support each of the procedures (such as those related to FIGS. 10, 11, and 12). As such, any given access point may not include a positioning calculation module 432 and/or client location register 434, again, these modules being optional as indicated above.

Note that in the following descriptions, when requests are made to the WLAN client services module 442, system control module 446 initially receives the request and then invokes the appropriate sub-module (444 or 448). However, for ease of description, this step is not discussed below.

Figure 9:
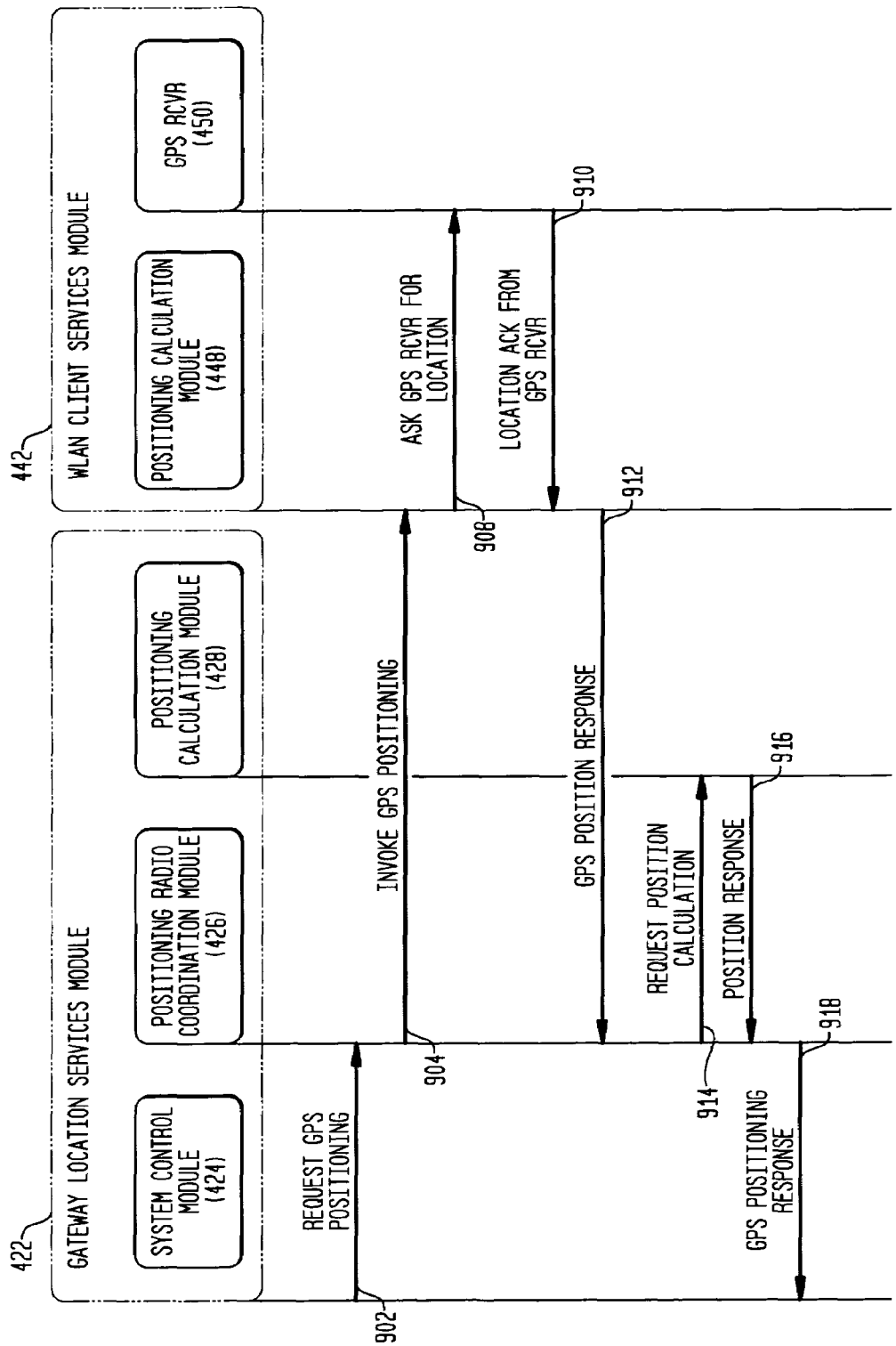
FIG. 9 illustrates a process flow of a first example positioning procedure supported by the functional architecture of FIG. 8 for determining the physical location of a WLAN client.

Beginning with FIG. 9, there is illustrated a process flow of a first example positioning procedure for determining the location of a WLAN client. In this example procedure, the WLAN client tunes to GPS satellites to obtain its current longitude and latitude coordinates. This procedure assumes the WLAN client includes GPR receiver 450. Accordingly, beginning with step 902, system control module 424 of the gateway location services module 422 first invokes positioning radio coordination module 426, as described above, indicating the IP address of the WLAN client and that GPS positioning should be used. Upon receiving this request, positioning radio coordination module 426 sends a message to positioning calculation module 448 of the WLAN client services module 442 specifying that GPS positioning should be used to determine the physical location of the client (step 904). Upon receiving this message, positioning calculation module 448 communicates with GPS receiver 450 within the WLAN client to obtain longitude and latitude coordinates for the WLAN client (steps 908 and 910). The GPS receiver may also return the accuracy of this measurement.

In step 912, positioning calculation module 448 then returns the obtained longitude and latitude coordinates and accuracy measurement, if available, back to positioning radio coordination module 426. The positioning radio coordination module then communicates with positioning calculation module 428 (steps 914) within the gateway location services module 422 to convert the longitude and latitude coordinates and accuracy measurement to a standard format. In step 916, positioning calculation module 428 then returns the result to positioning radio coordination module 426, which in turn sends the converted location to system control module 424 (step 918). As described above, system control module 424 then routes this position estimate back to the GMLC either directly, or indirectly through the MSC/SGSN.

Figure 10:
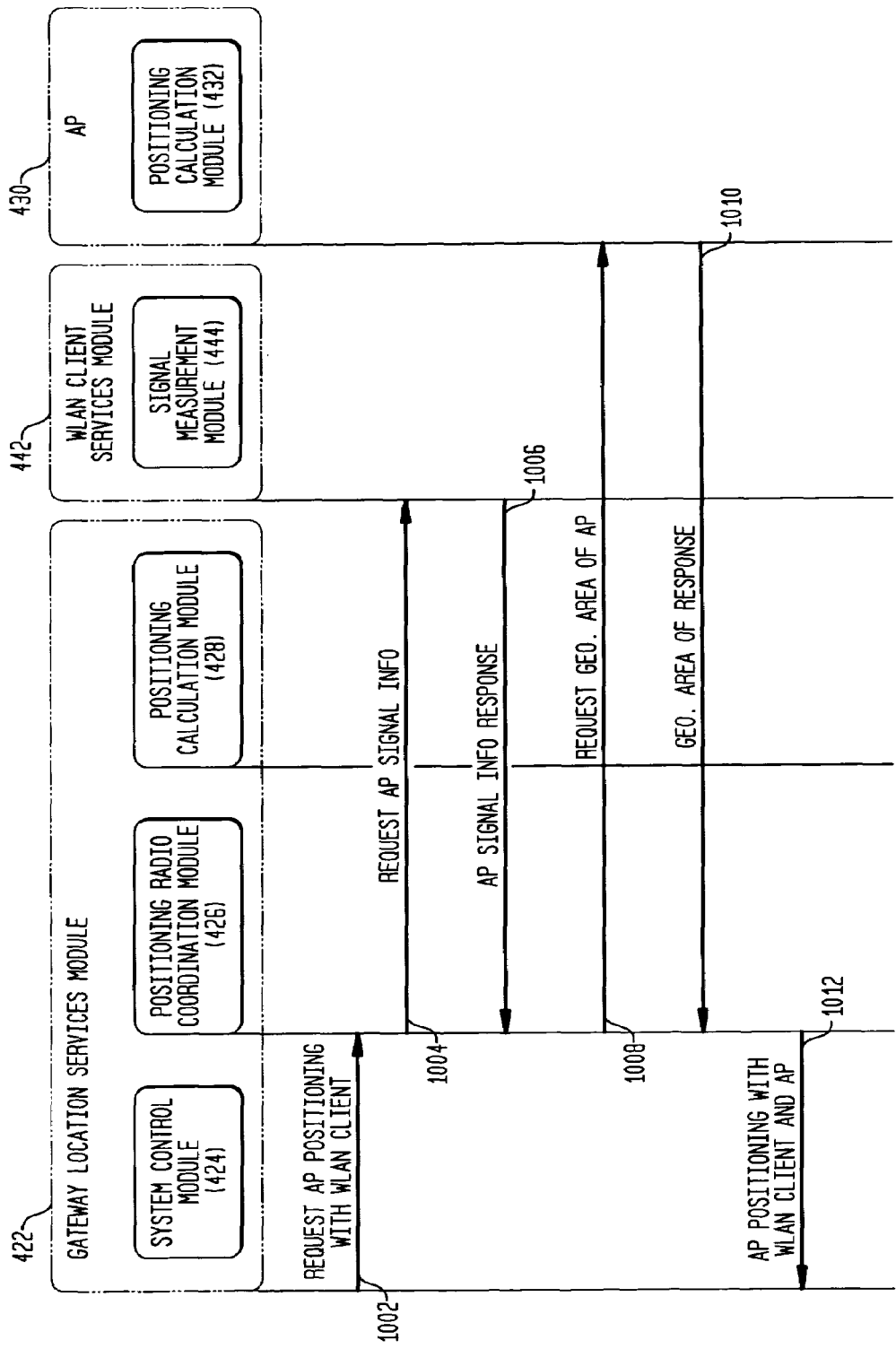
FIG. 10 illustrates a process flow of a second example positioning procedure supported by the functional architecture of FIG. 8 for determining the physical location of a WLAN client.

Referring to FIG. 10, there is illustrated a process flow of a second example positioning procedure for determining the location of a WLAN client. In this positioning procedure, the physical location of the WLAN client is based on the location of an access point within the WLAN network. Specifically, as is known, each access point 430 within a WLAN network has a specific geographic location and a specific geographic area that it services, this being determined by the strength of the signals the access point transmits. In accordance with this example location method, each access point is configured with its physical location. For example, the physical location can be represented as X,Y coordinates, longitude and latitude coordinates, a street address, a zip code, or any other methodology known in the art for capturing the physical location of an entity. Each access point may also be configured with its geographic coverage/service area. Again, this coverage area can be expressed in any known way, such as a radial measurement, street addresses, etc. The physical location and service area information are stored within a register of the access point, for example, and can be set and retrieved through position calculation module 432 of the access point using SNMP or HTML commands, for example.

As is also known, the coverage areas of access points typically overlap. In order for a WLAN client to select an access point through which it will connect to the WLAN network, the interface card of the WLAN client will periodically perform signal strength measurements of the signals it receives from each access point. The WLAN client will then typically associate itself with the access point that provides the strongest signal.

In accordance with this second example positioning procedure, the WLAN client is queried to determine which access point is providing the strongest signal measurement, as described below. Here, it is assumed that the access point providing the strongest signal is closest in proximity to the WLAN client. As such, based on the indicated access point, that access point is then queried for its physical location and service area, this location thereby representing the approximate location of the WLAN client.

Specifically, beginning with step 1002 of FIG. 10, system control module 424 of gateway location services module 422 first invokes positioning radio coordination module 426 requesting that the WLAN client location be based on the location of an access point within range of the WLAN client, here, the WLAN client specifying the access point. Upon receiving this request, positioning radio coordination module 426 sends a corresponding request (step 1004) to signal measurement module 444 of the WLAN client services module 442, requesting that the module determine which access point is providing the strongest signal to the WLAN client. Here, signal measurement module 444 can make this determination in several ways. For example, signal measurement module 444 can simply determine which access point the WLAN client is currently associated with (as configured within the WLAN client). Here, the assumption is that since the WLAN client is associated with this access point, the access point is providing the strongest signal and is thereby the closest access point to the WLAN client. Alternatively, signal measurement module 444 can perform and gather, through the WLAN client's interface card, uplink and downlink signal measurements with access points within range of the WLAN client. Based on these measurements, signal measurement module 444 then determines which access point is providing the strongest signal, and selects this access point.

As is known, a WLAN client will know the wireless-interface MAC-address of each access point it is communicating with. As is also known, MAC-addresses are unique and as such, provide a mechanism to identify an access point. Accordingly, upon determining which access point is providing the strongest signal to the WLAN client, signal measurement module 444 obtains the MAC-address corresponding to this access point and returns this MAC-address to positioning radio coordination module 426 (step 1006).

Upon receiving the MAC-address, positioning radio coordination module 426 next queries position calculation module 432 of the corresponding access point, using SNMP or HTML commands for example, to obtain the access point's physical location and if available, its geographic service area (steps 1008 and 1010). Here, the size of the service area represents the accuracy of the location of the WLAN client given that the WLAN client can be anywhere within that service area. In step 1012, positioning radio coordination module 426 then returns the access point's physical location and geographic service area to system control module 424.

Figure 11:
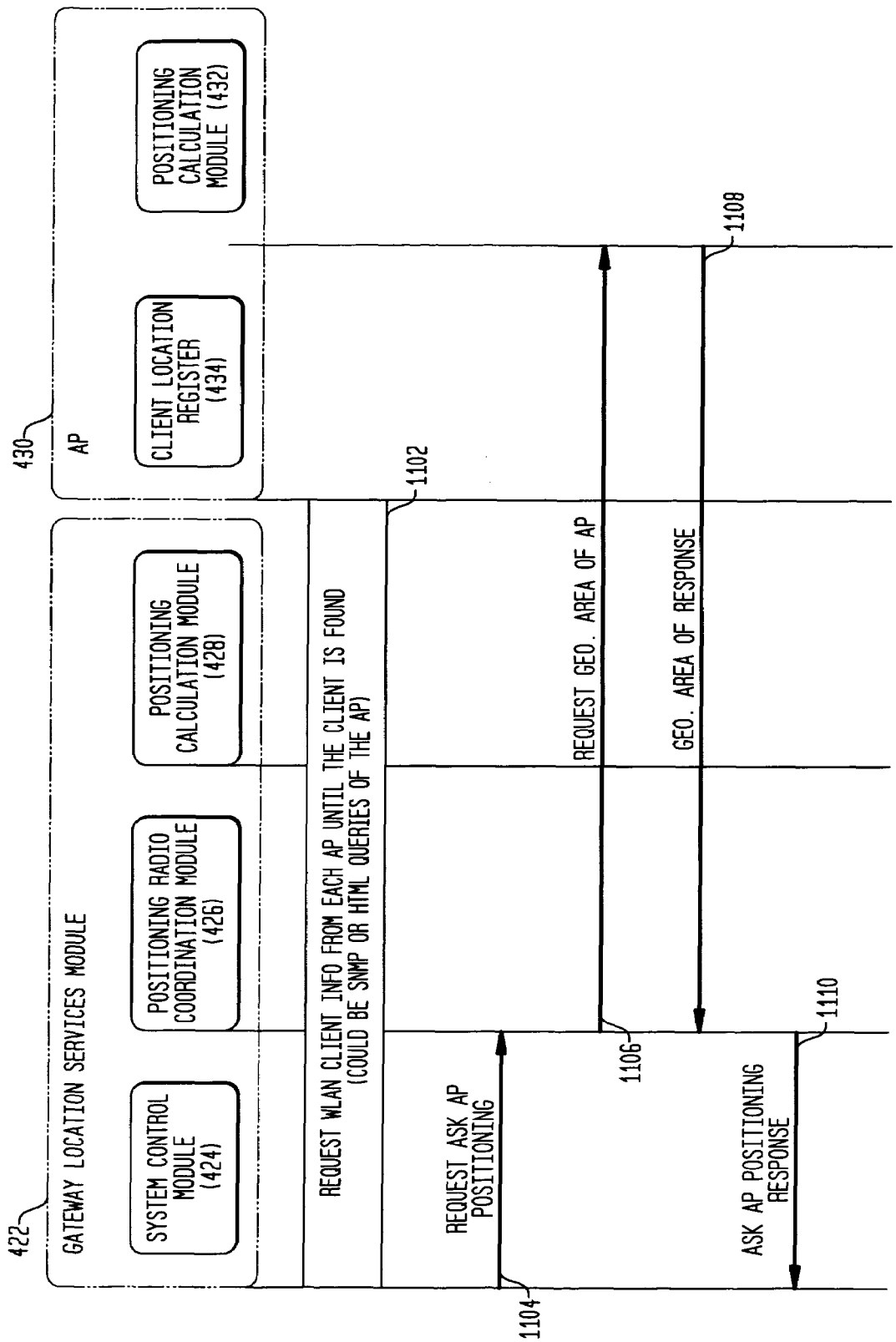
FIG. 11 illustrates a process flow of a third example positioning procedure supported by the functional architecture of FIG. 8 for determining the physical location of a WLAN client.

Referring to FIG. 11, there is illustrated a process flow for a third example positioning procedure for determining the location of a WLAN client. This positioning procedure is similar to the previous procedure of FIG. 10 in that the physical location and service area of an access point are used as the approximate location of a WLAN client. However, here, the WLAN client is not asked to provide an access point in close proximity as the basis for its location. Rather, as is known, each access point in a WLAN network will maintain a register specifying all WLAN clients the access point is currently associated with. This register can be accessed through client location register 434 of the access point using SNMP or HTML commands, for example, indexing the register using the IP addresses of the WLAN clients, for example. Accordingly, a determination can be made as to which access point is currently associated with a WLAN client. Once having the associated access point, the access point's physical location and service area are obtained through position calculation module 432 and this information is then used as the approximate location of the WLAN client.

Specifically, beginning with step 1102 of FIG. 11, system control module 424 of gateway location services module 422 first queries each access point within the WLAN network in order to determine which access point is currently associated with the requested WLAN client. These queries can be made through client location register 434 at each access point using SNMP or HTML based queries, for example, and using the IP address of the WLAN client as an index. In response to these queries, the access point associated with the WLAN client returns to system control module 424 the access point's wireless-interface MAC-address, for example. System control module 424 then invokes positioning radio coordination module 426 (step 1104), passing it the MAC-address of the access point and requesting that the location of this access point be determined. Upon receiving this request, positioning radio coordination module 426 accesses position calculation module 432 of the specified access point, using SNMP or HTML commands for example, to obtain the access point's physical location and service area (steps 1106 and 1108). In step 1110, positioning radio coordination module 426 then returns these values to system control module 424. Again, the physical location of the access point represents the location of the WLAN client, with the access point's service area representing the accuracy of the location.

Reference will now be made to several additional positioning procedures, each of which utilizes "access point positioning database" 802 or 804. As described above, each access point within a WLAN network can individually maintain its physical location and service/coverage area. As an alternative to this arrangement, or in addition to this arrangement, this information can also be maintained in a database. Such a database can be indexed, for example, using the MAC-address from the wireless interface of each access point. Again, these MAC addresses are unique. In order to populate the database, the physical location and service area of each access point can be entered during a provisioning phase. Alternatively, the information can be stored within each access point and each access point then queried to populate the database.

As shown in FIG. 8, a separate access point positioning database 802 can be maintained in each WLAN network by gateway 420. Alternatively, a regional database 804 covering several WLAN networks can be maintained. As an example, a regional server, such as a serving mobile location center (SMLC) 810 (which is a network element residing in the cellular network), can maintain such a regional database.

Figure 12:
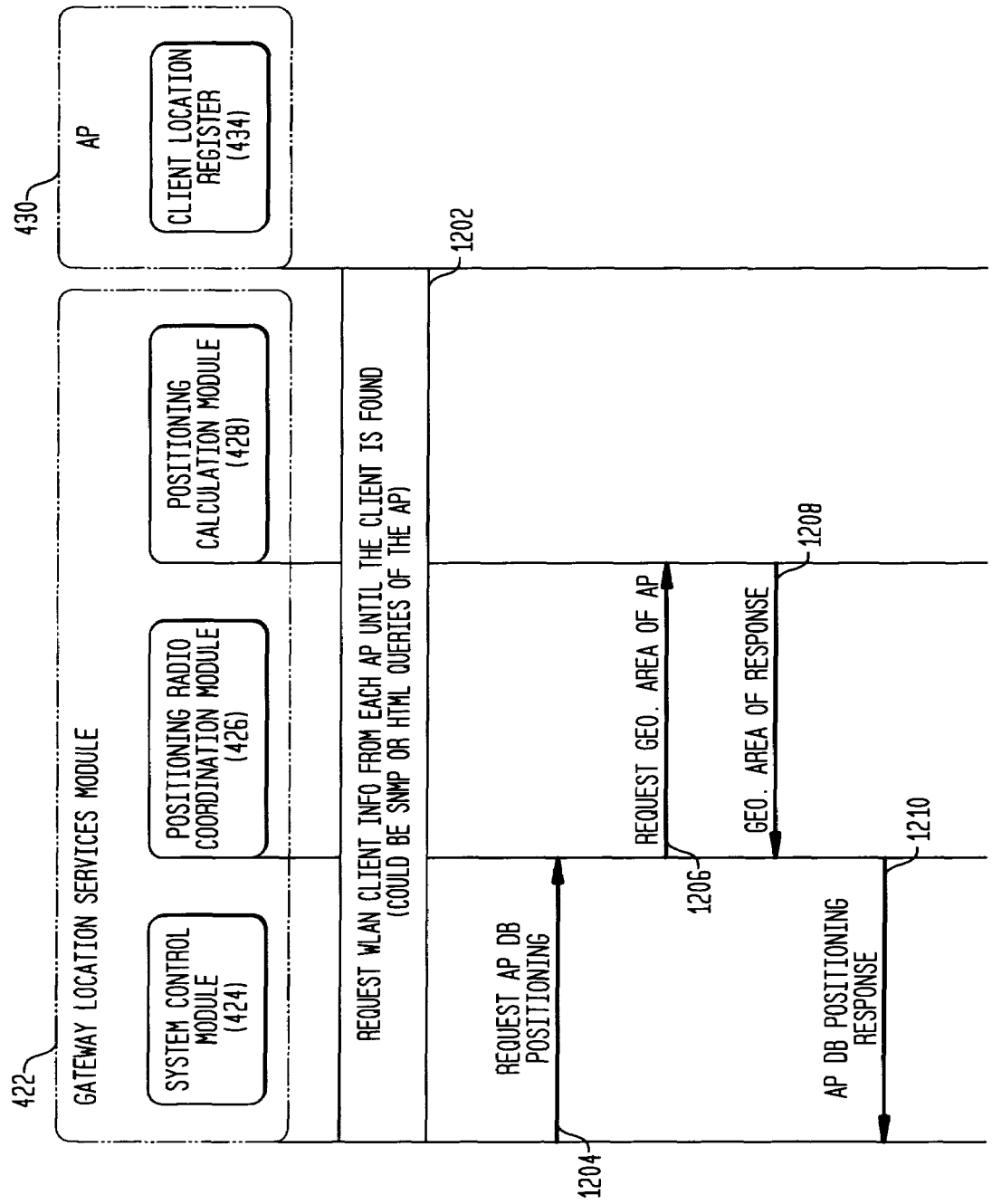
FIG. 12 illustrates a process flow of a fourth example positioning procedure supported by the functional architecture of FIG. 8 for determining the physical location of a WLAN client.

Referring now to FIG. 12, there is illustrated a process flow of a fourth example positioning procedure for determining the location of a WLAN client. This positioning procedure is similar to the third procedure described above in FIG. 11; however, access point positioning database 802/804 is now used to obtain the physical location and service area of an access point, rather than querying the access points themselves.

Accordingly, beginning with step 1202, system control module 424 of gateway location services module 422 first queries each access point within the WLAN network through the access points' client location registers 434 to determine which access point is currently associated with the requested WLAN client. In response to these queries, the access point associated with the WLAN client returns to system control module 424 the access point's wireless-interface MAC-address, for example. System control module 424 then invokes positioning radio coordination module 426 (step 1204), passing it the MAC-address of the access point and requesting that the location of this access point be determined through database 802/804.

Upon receiving this request, positioning radio coordination module 426 communicates with positioning calculation module 428, specifying the access point (step 1206). Positioning calculation module 428 in turn then accesses "access point positioning database" 802 to obtain the physical location and service area of the specified access point. Alternatively, if a given WLAN network does not have an access point positioning database 802, positioning calculation module 428 makes a request to SMLC 810, for example, and in particular, to "database interface module" 808 at SMLC 810, as represented by connection 814 in FIG. 8. Here, database interface module 808 accesses access point positioning database 804 and returns the physical location of the requested access point back to positioning calculation module 428. Once having the physical location of the request access point, whether obtained from access point positioning database 802 or from access point positioning database 804, positioning calculation module 428 then returns the obtained location to positioning radio coordination module 426 (step 1208), which returns the result to system control module 424 (step 1210).

Figure 13:
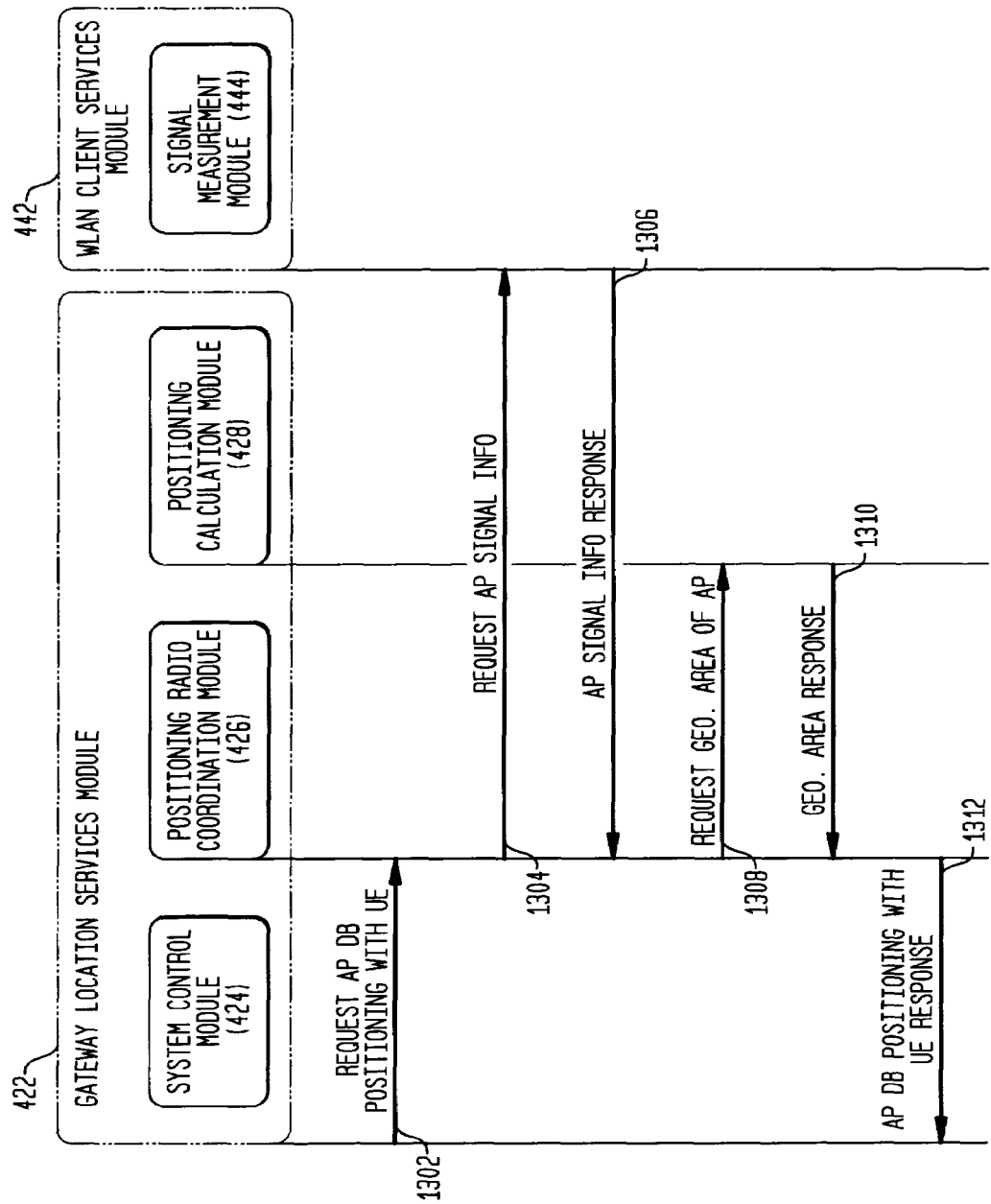
FIG. 13 illustrates a process flow of a fifth example positioning procedure supported by the functional architecture of FIG. 8 for determining the physical location of a WLAN client.

Referring now to FIG. 13, there is illustrated a process flow of a fifth example positioning procedure for determining the location of a WLAN client. This positioning procedure is similar to the second procedure described above in FIG. 10, however, access point positioning database 802 or 804 is now used to obtain the physical location and service area of an access point, rather than querying the access points themselves. As such, beginning with step 1302, system control module 424 first invokes positioning radio coordination module 426 requesting that the WLAN client location be based on the location of an access point as obtained through database 802/804, here, the WLAN client specifying the access point. Upon receiving this request, positioning radio coordination module 426 sends a corresponding request to signal measurement module 444 of WLAN client services module 442, requesting that module 444 determine which access point is closest in proximity, or in other words, is providing the strongest signal to the WLAN client (step 1304). As described with respect to FIG. 10, signal measurement module 444 can make this determination, for example, by simply determining which access point the WLAN client is currently associated with or by making uplink and downlink measurements and selecting the access point that is providing the strongest signal. Again, upon selecting an access point, signal measurement module 444 obtains that access point's wireless-interface MAC-address and returns this MAC-address to positioning radio coordination module 426 (step 1306).

Upon receiving the MAC address, positioning radio coordination module 426 communicates with positioning calculation module 428, specifying the access point (step 1308).

Positioning calculation module 428 in turn accesses access point positioning database 802 or access point positioning database 804, as described above, to obtain the physical location and service area of the specified access point. Positioning calculation module 428 then returns this obtained location to positioning radio coordination module 426 (step 1310), which returns the result to system control module 424 (step 1312).

As a further alternative to this fifth positioning procedure, signal measurement module 444 of the WLAN client services modules 442 returns to positioning radio coordination module 426 not only the MAC-address of the access point providing the strongest signal to the WLAN client, but also the signal measurement itself. Here, positioning calculation module 428 obtains the physical location and geographic service area of the specified access point using database 802/804, as described above (alternatively, the access point itself can be accessed to obtain it physical location, as described above). In addition, however, positioning calculation module 428 then uses the signal strength measurement to further refine, using known calculation functions, where the WLAN client may be located within the geographic service area, thereby improving the accuracy of the WLAN client's position. Here, the positioning calculation module may also provide an accuracy estimate.

As a still further alternative to this fifth positioning procedure, rather than only returning the MAC address and signal strength measurement of the access point providing the strongest signal, signal measurement module 444 may perform uplink/downlink signal measurements and then return to position radio coordination module 426 the signal strength measurement and MAC address of each access point the WLAN client is able to communicate with. Here, positioning calculation module 428 obtains the physical location and service area of each specified access point (again, by accessing database 802/804 or by querying the specified access points). Using known calculation functions, positioning calculation module 428 then combines this information to obtain a still further refinement in the WLAN client's position. For example, RF triangulation techniques can be used if the received signal strength from three or more access points is known. Here again, the positioning calculation module may also provide an accuracy estimate.

Referring now to a sixth example positioning procedure, as described above with reference to FIG. 9, gateway location services module 422 essentially asks the WLAN client services module 442 to provide the location of the WLAN client. In that example, the WLAN client services module 442 utilizes a GPS receiver and GPS satellites to determine the physical location of the WLAN client. As a variation of that example positioning procedure, in response to being asked to provide a location, the WLAN client services module 442 can ask the WLAN client user/subscriber for a location, rather than using GPS. For example, the WLAN client services module 442 can request that the user provide a zip code or street address. The WLAN client services module would then provide this location back to the gateway location services module 422 as the physical location of the WLAN client.

Figure 14:
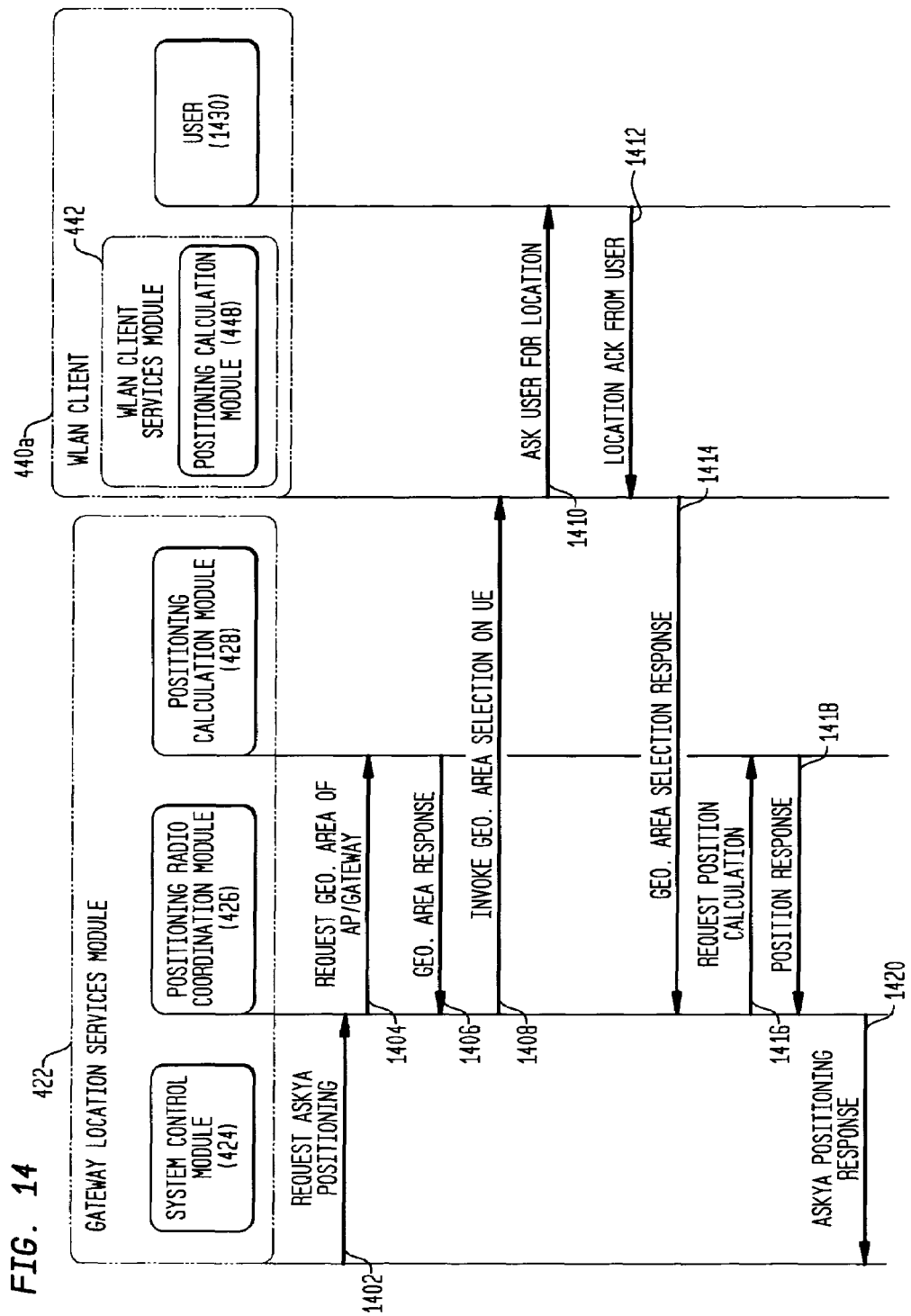
FIG. 14 illustrates a process flow of a sixth example positioning procedure supported by the functional architecture of FIG. 8 for determining the physical location of a WLAN client.

As a further variation of asking the WLAN client services module 442 for a location, the gateway location services module 422 can provide the WLAN client services module 442 with a general location of the WLAN client (e.g., module 422 can provide the physical location and service area of an access point in close proximity to the WLAN client, the location of the access point being obtained from the access point directly or from a database 802/804, as described above) and then request that the WLAN client services module further delineate a location within this general location. Here, the WLAN client services module 442 can use the general location in combination with a GPS receiver and GPS satellites to perform assisted GPS, as is known in the art. Alternatively, the WLAN client services module 442 can ask the WLAN client user/subscriber for its location within the general location. This latter variation is illustrated in FIG. 14.

Specifically, beginning with step 1402, system control module 424 first invokes positioning radio coordination module 426 indicating that the WLAN client user should be asked directly for its location. Here, positioning radio coordination module 426 needs to know the general location of the WLAN client. As indicated, the physical location of an access point in close proximity to the WLAN client can be used as the general location. As such, a determination is first made as to which access point the WLAN client is currently associated with and/or which access point is providing the strongest signal to the WLAN client, for example (note that this step is not shown in FIG. 14). This determination can be made using any of the procedures described above. For example, system control module 424 can query each access point, as described above, to determine which access point has the WLAN client in its register. Alternatively, positioning radio coordination module 426 can communicate with the WLAN client to obtain the MAC-address of the access point providing the strongest signal, etc.

Assuming positioning radio coordination module 426 now knows an access point in close proximity to the WLAN client, module 426 provides this access point (in other words, its MAC-address, for example) to positioning calculation module 428 (step 1404). Positioning calculation module 428 in turn accesses access point positioning database 802 or access point positioning database 804 to obtain the physical location and service area of the specified access point. Positioning calculation module 428 then returns this information to positioning radio coordination module 426 (step 1406). Alternatively, an access point can be queried directly for its physical location, as described above. Regardless of how the physical location of the access point is obtained, the determined location then acts as a point of reference or delineation for the subsequent steps. Specifically, positioning radio coordination module 426 next provides the location of the access point to positioning calculation module 448 of WLAN client services module 442 (step 1408). Positioning calculation module 448 uses this location information to provide WLAN client user 1430 with a point of reference as to the user's current location (step 1410). For example, the positioning calculation module 448 may invoke a graphical interface of a map, indicating to the user that its current location is within a given bounded area. Here, the user is then asked to further pinpoint its current location. For example, the user may point and click to a location on the map. Alternatively, the user may provide a zip code or street address. Regardless, the further delineated location is obtained by positioning calculation module 448 (step 1412) and then returned to positioning radio coordination module 426 (step 1414).

Next, positioning radio coordination module 426 forwards the delineated location back to positioning calculation module 428 (step 1416), which uses this information to estimate a physical location of the WLAN client and if possible, to provide a measure of accuracy in this location. This position information is then returned to positioning radio coordination module 426 (step 1418) and to system control module 424 (step 1420).

Referring now in greater detail to regional server/SMLC 810, as indicated above, this server can maintain a regional access point positioning database 804 that contains location information of access points across one or more WLAN networks. As also described, the positioning calculation modules 428 within the gateways 420 can access database 804 through database interface module 808 to obtain the location of access points when determining WLAN client positions. In general, this arrangement allows for the consolidation of resources such that each of a plurality of gateways 420 does not need to maintain a database 802.

As further illustrated in FIG. 8, regional server/SMLC 810 can optionally also include a positioning calculation module 806. Specifically, according to a further embodiment of the present invention, the functionality of positioning calculation module 428 within gateways 420 as described with respect to the positioning procedures of FIGS. 12, 13, and 14 for example, can be moved to SMLC 810, thereby making such functionality regional and further consolidating resources, and also simplifying the gateways 420 (i.e., here, each of a plurality of gateways 420 would not need to include a positioning calculation module 428). According to this embodiment of the invention, rather than positioning calculation module 426 communicating with positioning calculation module 428 within the gateway, module 426 will communicate with positioning calculation module 806 within the SMLC, as represented by connection 812 in FIG. 8. In this case, positioning calculation module 806 functions as described above for positioning calculation module 428, communicating with database 804 through database interface module 808 and performing necessary calculations. Once having a determined/calculated location of a WLAN client, positioning calculation module 806 returns the location to positioning calculation module 426.

Overall, one skilled in the art will recognize that the present invention is not limited to the positioning procedures described above and other procedures and variations of the above procedures are possible. For example, known RF fingerprinting techniques can be used. Here, the service provider makes an RF fingerprint of a known area. To make the RF fingerprint, the service provider measures received signal strengths from multiple access points and records the exact position where each received signal strength measurements is made. When the position of a WLAN client is requested, the WLAN client measures the received signal strength from multiple access points and an algorithm is used to compare these measurements against the RF fingerprint to determine the position of the WLAN client. Time difference of arrival is a further alternative for a radio-based positioning technique.

As another alternative, a WLAN client may have duel interfaces such that it can access both a cellular network (i.e., radio access network) and a WLAN network. These duel interfaces allow for the WLAN client's location to be determined from either the cellular network and/or the WLAN network. For example, an external LBS client may request a WLAN client's location, causing the WLAN client to receive the request from the WLAN network. In this case, the WLAN client could initiate a session with the cellular network and acting as an LBS client itself, make a request for its own location using location-based services for the cellular network. Once receiving this location, the WLAN client could return the location to the original external LBS client. As a further alternative, the WLAN client's location could be determined from both the WLAN network and cellular network and then combined.

Advantageously, according to the present invention, a single location based services request can be made for a wireless subscriber whether that subscriber is located on a cellular network or WLAN network. As such, the present invention provides for an industry-wide architecture for ubiquitously locating wireless subscribers. In addition, although the present invention has been described relative to an integrated GSM/GPRS/UMTS cellular and WLAN network, as defined by the 3GPP, the present invention is also applicable to other cellular networks. Specifically, as described above, the WLAN specific positioning procedures and functionality are located within a gateway allowing the gateway to insulate the cellular network from the WLAN specifics. In addition, according to the present invention, a cellular component (such as a GMLC) can directly invoke the WLAN positioning procedures through direct communications to the gateway. As such, by modifying the cellular network-gateway interface (i.e., GMLC interface module 421), the gateway and related functionality can be moved to other cellular networks, such as IS-95 and CDMA 2000 networks, to provide location based services.

It should also be noted that the present invention is not limited to location based services for integrated cellular and WLAN networks. Specifically, through a gateway similar to gateway 420, LANs (e.g., Ethernet) can also be interfaced to core networks, such as core network 402. Here, the gateway may interface GMLC 404 directly or indirectly through an MSC/SGSN, as described above.

In such an integrated network, each LAN client, similar to WLAN clients, will have a home network and an HLR that tracks the location of the client. In other words, like a WLAN client, a LAN client can move between LAN networks with the client's HLR maintaining the client's current location. For example, a LAN client such as a laptop may interface to a LAN at work and to another LAN at a coffee shop, with the client's HLR maintaining an address of the MSC/SGSN/gateway to which the client is currently registered.

In this way, LBS client 450 can make location based services requests to GMLC 404 for both wireless subscribers and LAN subscribers. Again, the GMLC does not need to differentiate as to which type of subscriber the request pertains to. Given an identifier for a mobile station, WLAN client, or LAN client, the GMLC can access the corresponding HLR and obtain the address of the MSC/SGSN/gateway corresponding to the network (i.e., radio access network, WLAN network, or LAN) to which the requested subscribed is currently associated. The GMLC then forwards a location based services request to the corresponding network either directly, or indirectly through an MSC/SGSN.

In the case of LAN networks, the gateway and LAN clients within each network will contain modules similar to "gateway location services module" 422 and "WLAN client services module" 442, these modules executing positioning procedures within the LAN for determining the physical location of LAN clients. For example, GPS positioning can be used, as described above. Alternatively, procedures related to an access point positioning database may be used. Here, the database would contain the physical location of routers, hubs, etc. within the LAN network. When receiving a location based services request, the gateway can determine which router/hub a LAN is connected to by querying the LAN client, for example. Once knowing the router, the access point positioning database can be queried to determine the location of the router and this location then used as the basis for the LAN client's location.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for determining a physical location of a wireless local area network (WLAN) client, said method comprising:
   receiving at a location services module associated with a WLAN network a location request originating from a core network, said location request requesting said physical location of said WLAN client;
   communicating by said location services module with one or more network elements within said WLAN network to ascertain location based information;
   determining said physical location of said WLAN client based on said location based information received from the WLAN client;
   forwarding by said location services module said determined physical location of said WLAN client back to said core network; wherein said communicating comprises determining by said location services module one or more access points within said WLAN network from which said WLAN client is receiving signals; and
   wherein the determining said physical location comprises determining a physical location of individual of said one or more determined access points, and using said physical locations of said one or more determined access points as a basis for determining said physical location of said WLAN client; and
   wherein said determining physical locations for individual of said one or more determined access points comprises accessing by said location services module a database, said database maintaining physical locations for at least a plurality of access points in said WLAN network.

2. The method of claim 1, wherein said core network is part of a cellular network.

3. The method of claim 1, wherein said location services module receives said location request through either a mobile switching center (MSC) or a serving general packet radio system support node (SGSN) within said core network.

4. The method of claim 1, wherein said location request originates from a gateway mobile location center (GMLC) within said core network and does not pass through an MSC or SGSN.

5. The method of claim 1, further comprising, prior to said communicating:
   receiving said location request at an interface module associated with said location services module and said WLAN network;
   in response to said location request, accessing by said interface module a home location register (HLR) that maintains subscription data, including authentication data, for said WLAN client;
   using said authentication data by said interface module to authenticate said WLAN client; and
   passing by said interface module to said location services module said location request if said WLAN client is authenticated.

6. The method of claim 1, wherein said communicating comprises requesting by said location services module that said WLAN client determine one or more access points within said WLAN network from which said WLAN client is receiving signals, and receiving at said location services module from said WLAN client said one or more determined access points.

7. The method of claim 6, wherein said requesting comprises said location services module requesting that said WLAN client also determine a signal strength measurement corresponding to individual of said one or more determined access points.

8. The method of claim 1, wherein said database is a regional database.

9. The method of claim 1, wherein said physical location determining comprises said location services module causing a regional server to compute said physical location of said WLAN client based on said location based information.

10. The method of claim 1, wherein said communicating comprises forwarding by said location services module to said WLAN client a request for said WLAN client to obtain a location of said WLAN client, said location based information comprising said obtained location.

11. The method of claim 10, wherein said location services module also provides to said WLAN client an approximate location of said WLAN client, said approximate location acting as a point of reference for said obtained location.

12. A system associated with a WLAN network for determining a physical location of a WLAN client interfaced to the WLAN network, said system comprising:
   at least one computing device configured to operate at least one of:
      a system control module configured to receive from a mobile switching center (MSC) or a serving general packet radio system support node (SGSN) of a core network a location request for said physical location of said WLAN client and to select at least one positioning procedure to determine said physical location of said WLAN client;
      a positioning radio coordination module configured to communicate, according to said at least one positioning procedure, with one or more network elements within said WLAN network to ascertain location based information; and
      a positioning calculation module configured to determine said physical location of said WLAN client based on said location based information; and
   wherein said location based information obtained by said positioning radio coordination module comprises one or more access points within said WLAN network from which said WLAN client is receiving signals,
   wherein the positioning calculation module is configured to determine one or more physical locations for the one or more access points and use the one or more physical locations as a basis to determine the physical location of the WLAN client, the positioning calculation module further configured to communicate with a database maintaining physical locations for at least a plurality of access points in said WLAN network.

13. The system of claim 12, wherein said core network is part of a cellular network.

14. The system of claim 12, further comprising an interface module for directly interfacing with a gateway mobile location center (GMLC) within said core network, said interface module receiving said location request from said GMLC and passing said location request to said system control module.

15. The system of claim 12, wherein the positioning radio coordination module is configured to communicate with a WLAN client to obtain location based information.

16. A system for determining a physical location of a wireless local area network (WLAN) client, the system comprising:
   means associated with a WLAN network for receiving a location request originating from a core network, the location request requesting said physical location of said WLAN client;
   means for communicating with one or more network elements including a WLAN client within the WLAN network to ascertain location based information;

means for determining the physical location of the WLAN client based on the location based information received from the WLAN client;

means for forwarding the determined physical location of the WLAN client back to the core network; wherein said means for communicating comprises means for determining by said location services module one or more access points within said WLAN network from which said WLAN client is receiving signals; and wherein the means for determining said physical location comprises means for determining a physical location of individual of said one or more determined access points, and means for using said physical locations of said one or more determined access points as a basis for determining said physical location of said WLAN client; and wherein said means for determining physical locations for individual of said one or more determined access points comprises means for accessing by said location services module a database, said database maintaining physical locations for at least a plurality of access points in said WLAN network.

17. The system of claim 16, wherein the location request is received through either a mobile switching center (MSC) or a serving general packet radio system support node (SGSN) within the core network.

18. The system of claim 16, wherein the means for communicating comprises means for requesting by the location services module that the WLAN client determine one or more access points within the WLAN network from which the WLAN client is receiving signals, and means for receiving at the location services module from the WLAN client the one or more determined access points.

19. The system of claim 16, wherein the means for communicating comprises means for forwarding by the location services module to the WLAN client a request for the WLAN client to obtain a location of the WLAN client, the location based information comprising the obtained location.

20. A method for determining a physical location of a wireless local area network (WLAN) client, the method comprising:

receiving at a location services module a location request of a physical location of a WLAN client;

determining by the location services module one or more access points within a WLAN network from which the WLAN client is receiving signals;

communicating by the location services module with one or more network elements associated with the one or more access points to ascertain location based information;

accessing by the location services module a database maintaining information regarding physical locations of individual ones of the one or more access points;

using the information regarding physical locations of the individual ones of the one or more access points as a basis for determining the physical location of the WLAN client.

21. The method of claim 20, wherein the location services module receives the location request through either a mobile switching center (MSC) or a serving general packet radio system support node (SGSN).

22. The method of claim 20, wherein the location request originates from a gateway mobile location center (GMLC) and does not pass through a mobile switching center (MSC) or a serving general packet radio system support node (SGSN).

23. The method of claim 20, further comprising, prior to the communicating with one or more network elements:

receiving the location request at an interface module associated with the location services module and the WLAN network;

in response to receiving the location request, accessing by the interface module a home location register (HLR) that maintains subscription data, including authentication data, for the WLAN client;

using the authentication data by the interface module to authenticate the WLAN client; and passing by the interface module to the location services module the location request if the WLAN client is authenticated.

24. An apparatus associated with a WLAN network for determining a physical location of a WLAN client interfaced to the WLAN network, the apparatus comprising:

at least one computing device configured to operate at least one of:

a system control module configured to receive a location request for a physical location of a WLAN client and to select at least one positioning procedure to determine the physical location of the WLAN client;

a positioning radio coordination module configured to communicate, according to said at least one positioning procedure, with one or more network elements associated with one or more access points within the WLAN network to ascertain location based information related to the one or more access points; and a positioning calculation module configured to communicate with a database maintaining physical locations for at least a plurality of access points in said WLAN network to determine the physical location of the WLAN client based on the location based information.

25. The apparatus of claim 24, further comprising an interface module configured to interface with a gateway mobile location center (GMLC), the interface module configured to receive the location request from the GMLC and to pass the location request to the system control module.

26. An apparatus for determining a physical location of a wireless local area network (WLAN) client, the apparatus comprising:

means for receiving at a location services module a location request of a physical location of a WLAN client;

means for determining by the location services module one or more access points within a WLAN network from which the WLAN client is receiving signals;

means for communicating by the location services module with one or more network elements associated with the one or more access points to ascertain location based information;

means for accessing by the location services module a database maintaining information regarding physical locations of individual ones of the one or more access points;

means for using the information regarding physical locations of the individual ones of the one or more access points as a basis for determining the physical location of the WLAN client.

27. The apparatus of claim 26, further comprising:

means for receiving the location request at an interface module associated with the location services module and the WLAN network prior to communicating with one or more network elements;

means for, in response to receiving the location request, accessing by the interface module a home location register (HLR) that maintains subscription data, including authentication data, for the WLAN client;
means for using the authentication data by the interface module to authenticate the WLAN client; and
means for passing by the interface module to the location services module the location request if the WLAN client is authenticated.

* * * * *